United States Patent [19]
Fukuda et al.

[11] Patent Number: 5,355,586
[45] Date of Patent: Oct. 18, 1994

[54] WHEEL EXAMINING APPARATUS

[75] Inventors: Yutaka Fukuda, Tokorozawa; Yukio Higuchi, Fuji; Kiyoshi Masuda; Toshihiko Chisaki, both of Numazu, all of Japan

[73] Assignee: Anzen Motor Car Co., Ltd., Tokyo, Japan

[21] Appl. No.: 156,209

[22] Filed: Nov. 22, 1993

Related U.S. Application Data

[63] Continuation of Ser. No. 725,152, Jul. 3, 1991, Pat. No. 5,297,344.

[30] Foreign Application Priority Data

| Jul. 5, 1990 | [JP] | Japan | 2-176190 |
| Jul. 5, 1990 | [JP] | Japan | 2-176191 |
| Jul. 5, 1990 | [JP] | Japan | 2-176192 |
| Jul. 5, 1990 | [JP] | Japan | 2-176193 |

[51] Int. Cl.$^5$ ............................................ G01B 5/255
[52] U.S. Cl. ................................. 33/203.13; 33/203.12
[58] Field of Search ........................ 33/203–203.21, 33/288

[56] References Cited

U.S. PATENT DOCUMENTS

| 2,025,051 | 12/1935 | Haucke | 33/203 |
| 2,758,385 | 8/1956 | Martin | 33/203.12 |
| 3,137,076 | 6/1964 | Hurst | 33/203.12 |
| 4,055,899 | 11/1977 | Dean | 33/203.12 |
| 4,159,574 | 7/1979 | Samuelsson et al. | 33/228 |
| 4,567,667 | 2/1986 | Minagawa et al. | 33/203.12 |
| 4,885,846 | 12/1989 | Nemeth et al. | 33/203.13 |
| 4,962,664 | 10/1990 | Hirano et al. | 33/203.13 |
| 5,088,320 | 2/1992 | Fukuda et al. | 33/203.13 |
| 5,111,585 | 5/1992 | Kawashima et al. | 33/203.12 |
| 5,297,344 | 3/1994 | Fukuda et al. | 33/203.13 |

*Primary Examiner*—Christopher W. Fulton
*Attorney, Agent, or Firm*—Skjerven, Morrill, MacPherson, Franklin & Friel

[57] ABSTRACT

A wheel examining system for examining a two-axle or three-axle vehicle is provided. The wheel examining system includes a wheel examining apparatus for examining a wheel in particular as to its alignment. A wheel guide apparatus is provided for guiding a wheel into a predetermined examining site. The wheel guide apparatus includes a plurality of rollers arranged in different levels and orientations so that the wheel may be smoothly and properly guided into the examining site. A three-axle vehicle examining system includes three different examining sections one of which may be shifted in a transverse direction to determine a discrepancy in alignment of three axles. A wheel examining apparatus includes a roller clamp unit which includes left-hand contact rollers and right-hand contact rollers which may be brought into the opposite sides of a wheel. A pair of left-hand and right-hand angle detectors are provided in association with the left-hand and right-hand contact rollers to thereby detect the orientations of the opposite sides of a wheel independently. A floating support structure constructed by using a plurality of linear motion guide units is also provided.

7 Claims, 20 Drawing Sheets

WHEEL EXAMINING APPARATUS

This application is a continuation application Ser. No. 07/725,152, filed Jul. 3, 1991, now U.S. Pat. No. 5,297,344.

BACKGROUND OF THE INVENTION

1. Field of the Invention

This invention generally relates to a wheel examining apparatus for examining a wheel, in particular its alignment, such as the degree of inclination of a wheel, of a vehicle, such as an automobile, truck or trailer, and, in particular to a wheel examining apparatus for examining a wheel having a double wheel or double tire structure comprised of a pair of sub-wheels combined side-by-side for supporting a heavy load.

2. Description of the Prior Art

A wheel examining apparatus for examining the alignment or mounting condition of a wheel of an automobile, bus, truck, trailer or the like has been used. Various conditions are set in a wheel mounted on a vehicle and in particular the so-called inclination angles, such as toe angles, camber angles and caster angles are set in a wheel regarding its running performance. These inclination angles are examined once as one item of examination of a vehicle before the vehicle is shipped after manufacture, and they are also examined when a maintenance operation, such as exchange of wheels, is to be carried out for a vehicle after a period of use. In order for a vehicle to have an excellent running performance, it is important that these inclination angles be properly set and maintained. In addition, as a dynamic characteristic of a wheel, or a characteristic of a wheel while the wheel is in rotation, such parameters as wobbling of a wheel to the left and to the right and steered angle of a wheel are important. Since the running performance of a vehicle can be significantly affected by such a dynamic characteristic of wheels, it is quite important that the dynamic characteristic of a wheel can be measured at high accuracy. Moreover, there are those vehicles which use the so-called double wheel or double tire comprised of a pair of sub-wheels fixedly mounted side-by-side so as to increase the ability to support a heavier load. Since the stability of such a heavy duty vehicle is extremely important from the view point of safety in driving, it is also important that examination of such a double tire can be carried out properly and accurately.

Japanese Pat. Laid-open Pub. Nos. 51-83301 and 54-49701 disclose techniques for measuring the toe angle and/or camber angle of a wheel while the wheel is maintained in rotation. However, according to the teachings of these prior art techniques, although a wheel to be examined is supported on a pair of rollers to keep the wheels in rotation, either of the side surfaces of the wheel is not supported or a contact roller is brought into rolling contact with one side surface of the wheel to take measurements and the geometrical center of a wheel as an object to be measured is not located or determined by clamping the wheel from both sides, so that accurate measurements cannot be taken. On the other hand, Japanese Pat. Appln. Nos. 58-109235 and 59-9502 and Pat. Laid-open Pub. No. 61-41913 corresponding in content to U.S. Pat. No. 4,567,667 disclose techniques for locating or determining the geometrical center of a wheel supported on a floating table by clamping the wheel from both sides. However, according to these techniques, since the wheel supported on the floating table is static and non-rotating, there is no way to measure the dynamic characteristic of the wheel.

Japanese Pat. Laid-open Pub. No. 63-286742 corresponding to Japan Pat. Appln. No. 62-121128 and in content to U.S. Pat. No. 4,901,560 and U.S. Pat. No. 4,962,664 a divisional thereof, discloses a wheel examining apparatus capable of measuring the dynamic characteristic of a wheel while keeping the wheel in rotation under the condition of clamping the wheel from both sides. According to the teachings of this prior art reference, since a wheel is supported on a pair of rollers and the wheel is clamped by rollers at its opposite side surfaces, the dynamic measurement of a wheel can be carried out. However, the apparatus disclosed in this reference is suited mainly for examination of a wheel mounted on a four-wheel vehicle having two axles. Accordingly, the apparatus of the above-described prior art reference is not always satisfactory, in particular, for heavy load vehicles, such as larger-sized automobiles, trucks, buses and trailers, which normally have three or more axles and/or the so-called double wheel comprised of a pair of sub-wheels mounted side-by-side. For example, there are needs for improvements in a wheel guiding apparatus for guiding a wheel to a predetermined location of a wheel examining apparatus, improvements in examination of wheel alignment in a multi-axle vehicle having three or more axles, and improvements in accuracy in measuring the inclination angle of each of the component wheels in a double wheel system and in examination of a wheel of a vehicle suited for carrying heavy loads.

SUMMARY OF THE INVENTION

In accordance with a first aspect of the present invention, there is provided a wheel guide apparatus which includes a plurality of guide rollers arranged in different height levels and thus allows a wheel to travel along a predetermined path. This wheel guide apparatus is particularly suited for use in a wheel examining apparatus for locating a wheel to be examined at a predetermined location or area in the wheel examining apparatus. According to this aspect of the present invention, at least one center roller is rotatably provided as extending in a direction of advancement of a vehicle. Preferably, two or more such center rollers are arranged symmetrically to the left and to the right with respect to a predetermined reference center line. These center rollers are arranged to be approximately flush with or at a slightly higher level than a floor surface on which a wheel runs. Thus, while a wheel rides on these center rollers, a relative lateral movement between the wheel on the center rollers and the main body of a wheel examining apparatus can be provided with ease substantially in a direction perpendicular to the advancing direction of the wheel.

A plurality of first side rollers are rotatably provided at a first height higher in level than the center rollers and on both sides of the center rollers, and these first side rollers are arranged to be convergent in the advancing direction of a wheel so that the distance between the left and right first side rollers becomes gradually narrower in the advancing direction of a wheel. Preferably, these first side rollers are arranged to be symmetrical with respect to the predetermined center reference line. In addition, a plurality of second side rollers are rotatably provided as located generally outside of the first side rollers with respect to the reference center line and at a second height generally higher in level than the first side rollers. These second side rollers are also arranged to be convergent in the advancing direction of a wheel similarly with the first side rollers. Thus, the first and second side rollers are inclined such that their downstream ends come closer together as compared with their upstream ends with respect to the advancing direction of a wheel in the wheel guide apparatus. Preferably, these second guide rollers are also arranged to be symmetrical with respect to the predetermined reference center line.

In a preferred embodiment, at least one auxiliary roller is rotatably provided at the first height and in parallel with each of the second side rollers as being located inside and in close proximity thereof. The center rollers are preferably arranged side-by-side in a horizontal plane. On the other hand, the side rollers are preferably arranged to be inclined also in a vertical plane such that their downstream ends are located lower in height than their upstream ends with respect to the advancing direction of a wheel.

In accordance with a second aspect of the present invention, there is provided a wheel examining system for examining a three axle vehicle, which includes a front wheel examining section, an intermediate wheel examining section and a rear wheel examining section. Each of these three wheel examining sections includes a pair of wheel examining apparatuses, one for the left-hand side wheel and the other for the right-hand side wheel, which are operatively coupled or interconnected through an interconnecting or coupling means such that they are always located symmetrically with respect to a predetermined reference center line, which is normally the center line of such a wheel examining system. The intermediate wheel examining section and the rear wheel examining section are arranged to be adjacent to each other and in a side-by-side relation, and the interconnecting means of the intermediate wheel examining section is arranged in its rear side with respect to the direction of advancement of a vehicle in the present system, while the interconnecting means of the rear wheel examining section is arranged in the front side with respect to the direction of advancement of a vehicle. And, the wheel guide apparatus described above is provided at the entrance of the rear wheel examining section.

With this structure, the wheels of a three axle vehicle can be examined individually as well as simultaneously, and, for example, inclination angles of all of the wheels can be measured individually and at the same time. Even if the intermediate wheel examining section is provided, the overall size of the system can be minimized because of the distinctive arrangement of structural components, so that the present system can be used for a wider range of vehicles and the area requirement for installing the present system is minimized.

Furthermore, in accordance with this aspect of the present invention, there is provided a wheel examining system for a three axle vehicle, capable of examining whether or not all of the tread centers, which are defined as a center between the left-hand and right-hand side wheels, of the three axles lie on a common straight line, and capable of effectively measuring the inclination angle of each of the wheels even if there is a discrepancy in the alignment of these tread centers.

That is, the wheel examining system of a three axle vehicle according to this aspect of the present invention includes three wheel examining sections for three axles of a three axle vehicle, respectively, and each of the wheel examining sections includes a pair of wheel examining apparatuses, one for the left-hand side wheel of one axle and the other for the right-hand side wheel of the one axle. Each of the wheel examining apparatuses also includes an interconnecting means for interconnecting a pair of left and right wheel examining apparatuses such that the left and right wheel examining apparatuses are always located symmetrically with respect to a predetermined center line. In accordance with the present invention, two of the three wheel examining sections have each an interconnecting means whose center position is always fixed on a frame; whereas, the interconnecting means of the remaining wheel examining section has a center position which is movable with respect to the frame. In a preferred embodiment, the fixed center position is a center point defined on the frame and the movable center position is a movable center point movable along a rail mounted on the frame.

In each wheel examining apparatus, the center of a wheel supported on its supporting means can be brought into alignment with a predetermined center of the wheel examining apparatus, which is defined as a center of a clamping means. In this case, preferably, the alignment of these two centers is carried out by clamping the wheel from both sides. As described above, each left-hand side wheel examining apparatus is interconnected with an associated right-hand side wheel examining apparatus, so that these paired left-hand and right-hand side wheel examining apparatuses are always maintained symmetrical in position with respect to a predetermined reference center position. In this case, two of the three interconnecting means have respective two center positions fixed on the frame and a straight line connecting these two fixed center positions defines the reference center line. That is, a center line of a wheel to be examined is defined as a straight line connecting the tread centers on two axles, and this wheel center line is brought into agreement with the reference center line of the wheel examining system. The remaining interconnecting means has a center position which is shiftable on the frame. In a preferred embodiment, a rail is mounted on the frame extending in a direction transverse to the reference center line, and a slider is mounted on the rail to be slidable therealong with the center position of this interconnecting means is defined on this slider.

In accordance with a third aspect of the present invention, there is provided a wheel examining apparatus including inner and outer contact rollers which may be brought into contact with the inner and outer side surfaces of a wheel to have the wheel clamped from both sides; an inner and outer roller support members associated with the inner and outer contact rollers, respectively; and inner and outer angle detectors associated with the inner and outer roller support members, respectively. With this structure, since the inclination angle of each of the inner and outer side surfaces of a wheel can be measured individually and thus the inclination angle of a wheel can be measured at high accuracy.

In particular, in the case of a wheel having the so-called double wheel or double tire structure in which a pair of sub-wheels are mounted side-by-side, it is often the case that these two sub-wheels are not in identical in alignment. Even in such a case, since the inclination angle of each of these sub-wheels can be measured individually, the inclination angle of a wheel as a whole having such a double wheel structure can be properly and accurately measured. Thus, the wheel examining apparatus according this feature of the present invention allows to examine a double wheel assembly accurately and precisely.

In accordance with a fourth feature of the present invention, there is provided a floating support apparatus capable of setting a floating member, such as a floating table, for supporting thereon a desired object with the use of linear motion (LM) guides and rotary bearings.

In a floating support apparatus according to this aspect of the present invention, a first straight guide means is provided at each of at least three predetermined positions on the surface of a frame, and a first slider is provided in the first straight guide means to be slidable in a first direction. A second straight guide means is provided on the first slider and extends in a second direction different from the first direction. And, a second slider is provided on the second straight guide means to be slidable in the second direction. A projection is formed on the second slider. And, a floating member defining a floating plate is provided with a rotary bearing corresponding to each of such projections, and each of the projections is fitted into a corresponding rotary bearing. Accordingly, the floating member can freely move in any direction within a predetermined range in a horizontal surface so that it is maintained in a floating state.

Preferably, the first and second directions are set to be orthogonal to each other. Besides, the first straight guide, the first slider, the second straight guide and the second slider together define a bi-directional LM guide, and four of such bi-directional LM guide are arranged symmetrically. An object supporting means is provided on the floating member. Preferably, the object supporting means supports a wheel of a vehicle, and the floating support apparatus is incorporated in a wheel examining apparatus so as to support a wheel to be examined in a floating condition. With such a floating support apparatus, for example, when it is applied to a wheel examining apparatus, a wheel can be securely and stably maintained in a floating state even if such a wheel is a wheel having a double wheel or double tire structure and/or a vehicle is relatively heavy in weight.

It is therefore a primary object of the present invention to provide an improved wheel examining apparatus particularly suitable for use in examining wheels of large weight vehicles, such as large-sized automobiles, trucks, buses and trailers, at high accuracy.

Another object of the present invention is to provide a novel wheel guide apparatus capable of guiding various types of wheels, including a double wheel, into a predetermined location or area of a wheel examining apparatus stably and smoothly.

A further object of the present invention is to provide a novel wheel examining system particularly suited for use in examining a tri-axle vehicle including double wheels or double tires, capable of examining individual wheels of such a tri-axle vehicle individually and simultaneously at high accuracy and high speed.

A still further object of the present invention is to provide a novel wheel examining apparatus capable of examining each of sub-wheels of a double wheel or double tire assembly individually and simultaneously at high accuracy and high speed.

A still further object of the present invention is to provide a novel floating support apparatus capable of supporting an object, such as a wheel of a vehicle, in a floating state movable in any direction in a predetermined horizontal plane, which is particularly suitable for use in a wheel support structure in a wheel examining apparatus.

Other objects, advantages and novel features of the present invention will become apparent from the following detailed description of the invention when considered in conjunction with the accompanying drawings.

DESCRIPTION OF THE PREFERRED EMBODIMENTS

Now, with reference to the accompanying drawings, the present invention will be described in detail by way of embodiments.

Figure 1:
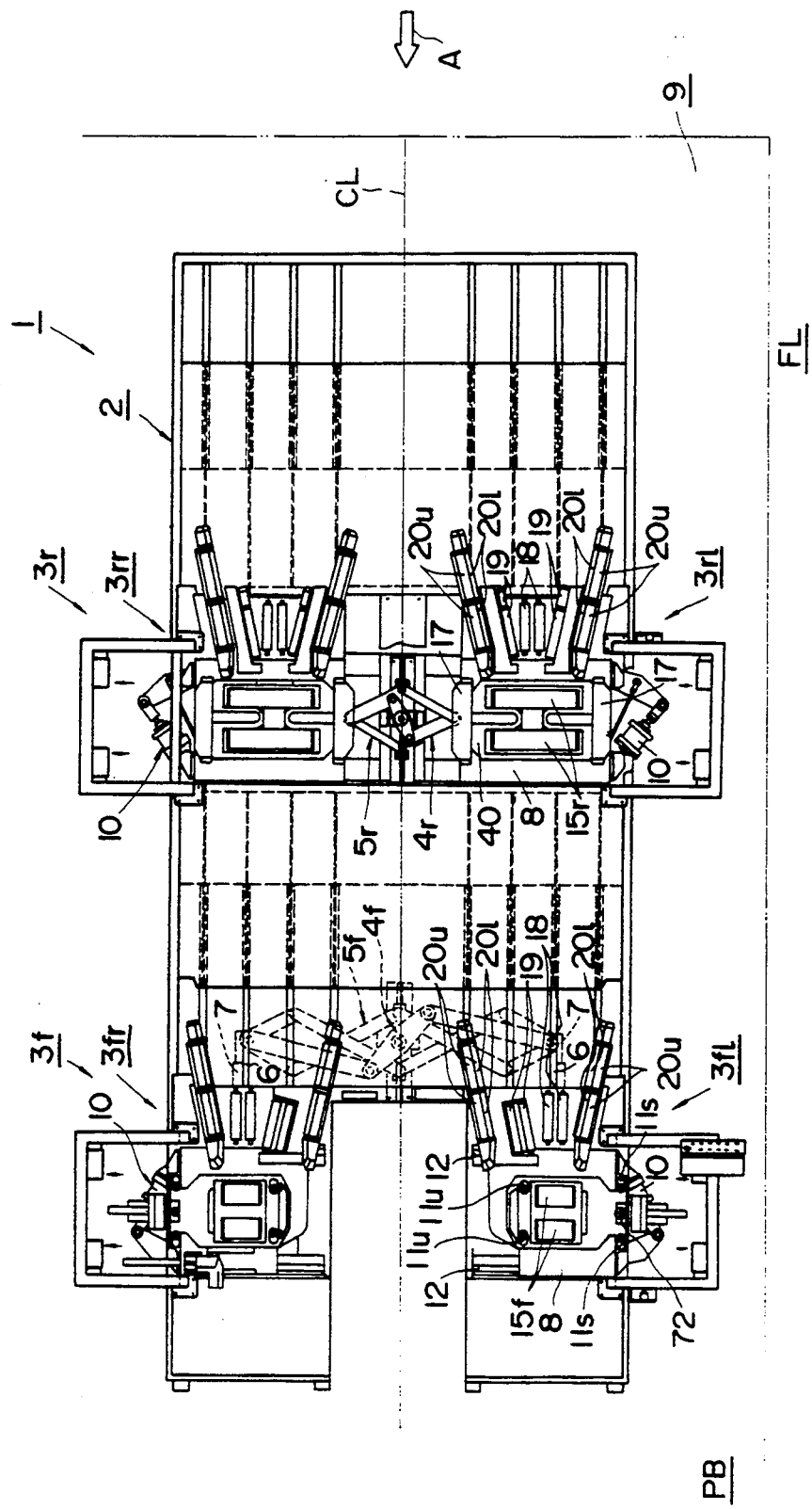
FIG. 1 is a schematic illustration showing in plan view a wheel examining system for examining wheels of a double-axle vehicle whose rear wheels have a double wheel or double tire structure constructed in accordance with one embodiment of the present invention.
Figure 2:
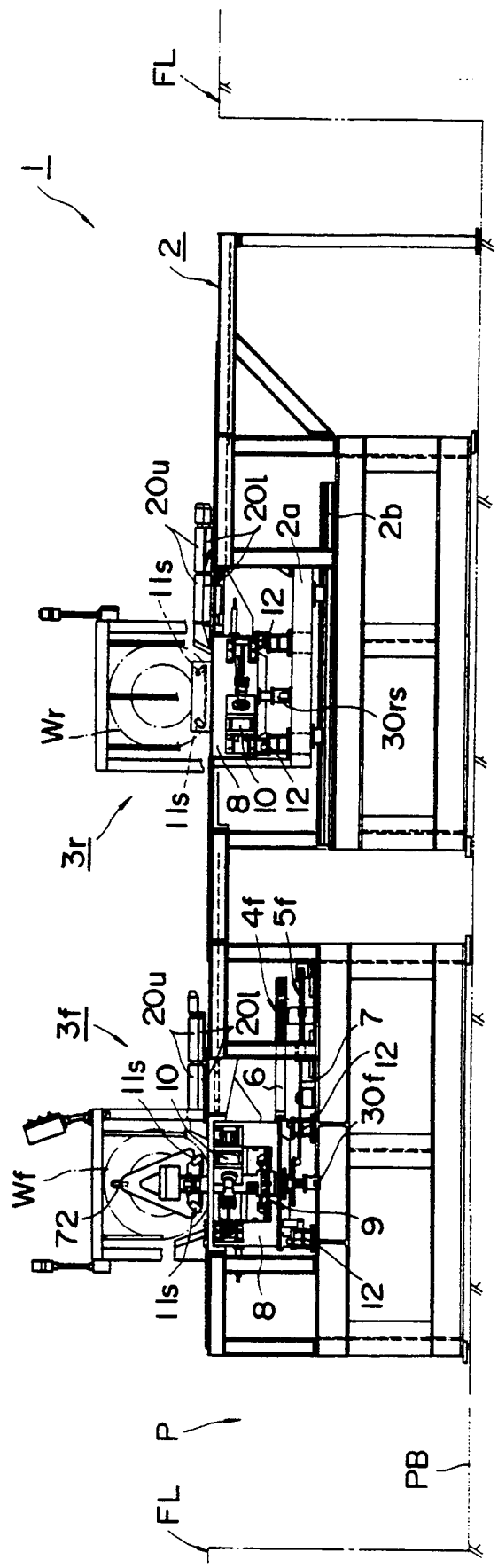
FIG. 2 is a schematic illustration showing in front view the wheel examining apparatus shown in FIG. 1.

Referring to FIGS. 1 and 2, there is schematically shown a wheel examining system 1 constructed in accordance with one embodiment of the present invention, which is particularly suited for use in examining a double-axle vehicle including left-hand and right-hand side rear wheels which have the so-called double wheel or double tire structure. The double wheel structure is a structure in which a wheel is comprised of a pair of sub-wheels which are combined together side-by-side and this type of wheel is normally used in large weight vehicles. The basic structure of this wheel examining system is similar to the structure described in the before-mentioned Japanese Pat. Laid-open Pub. No. 63-286742, and in U.S. Pat. No. 4,901,560 which is hereby incorporated by reference.

The present wheel examining system 1 is disposed in a pit P dug in a floor FL, for example, of a wheel examining site, and the wheel examining system 1 is installed as placed on the bottom PB of pit P with its top surface generally flush with the floor FL. As indicated by an arrow A in FIG. 1, a wheel to be examined is driven to run in this direction to be set in the present system 1. Since this wheel examining system 1 is for examining double-axle, and, thus, four-wheel vehicles, the system 1 generally includes a front wheel examining section 3f and a rear wheel examining section 3r. The rear wheel examining section 3r is located spaced apart backwardly from the front wheel examining section 3f, and, in the present system, in order to be able to make adjustments for vehicles having different wheel base distances, the distance between the front and rear wheel examining sections 3f and 3r can be adjusted to a desired value. That is, a frame 2 defining the overall base structure of the present system 1 is disposed inside the pit P and both of the front and rear wheel examining sections 3f and 3r are mounted on this frame 2. The front wheel examining section 3f is fixedly mounted on the frame 2, but the rear wheel examining section 3r is mounted on a slider unit 2a which is slidably mounted on guide rail 2b which in turn is fixedly mounted on the frame 2 extending in the longitudinal direction of the system 1. Thus, the slider unit 2a may be moved along the guide rails 2b in an unlocked condition, and after setting a desired distance between the front wheel examining section 3f and the rear wheel examining section 3r, the slider unit 2a may be locked in position on the frame 2.

The front and rear wheel examining sections 3f and 3r include a pair of right-hand and left-hand wheel examining apparatuses 3fr and 3fl and a pair of right-hand and left-hand wheel examining apparatuses 3rr and 3rl, respectively, and these right-hand and left-hand wheel examining apparatuses are arranged symmetrically with respect to a center line CL of the system 1. Since the right-hand and left-hand wheel examining apparatuses, i.e., 3fr and 3fl or 3rr and 3rl, are symmetrical in structure, they are substantially identical in structure. In addition, each of the wheel examining apparatuses 3fr and 3fl of the front wheel examining section 3f is substantially identical in structure to each of the wheel examining apparatuses 3rr and 3rl of the rear wheel examining section 3r, excepting the fact that each of the wheel examining apparatuses 3rr and 3rl of the rear wheel examining section 3f is modified for measuring the inclination angle of the so-called double wheel assembly.

In the first place, with reference to FIGS. 1 and 2, the wheel examining apparatus 3fl (same for 3fr) for a front wheel in the wheel examining system 1 will be described in detail. The wheel examining apparatus 3fl includes a pair of support rollers 15f for supporting thereon a left-hand front wheel Wf, and these support rollers 15f are disposed in parallel with their rotating axes extending in a direction substantially perpendicular to the longitudinal center line CL. The support rollers 15f are rotatably supported, and, in a preferred embodiment, a motor is incorporated in at least one of the support rollers to thereby provide a self-driving structure. If desired, it may be so structured that a driving force is transmitted to at least one of the support rollers from an externally provided motor, or the support rollers may be simply provided to be freely rotatable. In the case of a front wheel driven vehicle, the front wheel Wf may be driven to rotate on the support rollers 15f.

A pair of inner lower contact rollers 11u and a pair of outer lower contact rollers 11s for detecting a toe angle or the like are disposed on opposite sides of the support rollers 15f, and an upper contact roller 72 is provided at the outside of the support rollers 15f for detecting a camber angle or the like. These contact rollers 11 and 72 are brought into rolling contact with the opposite side surfaces of the wheel Wf supported on the support rollers 15f to have the wheel Wf clamped from both sides. Thus, with the opposite side surfaces clamped by these contact rollers 11 and 72, the wheel Wf may be set in rotation as riding on the support rollers 15f. In this manner, a dynamic test of the wheel Wf can be carried out. Although each of the contact rollers 11 and 72 is arranged such that its rotating axis extends substantially in a radial direction of the wheel Wf, the inner contact rollers 11u and the outer contact rollers 11s are not necessarily arranged symmetrically, and, in the illustrated embodiment, the outer contact rollers 11s are arranged with an angle somewhat larger than the angle of arrangement of the inner contact rollers 11u. The outer lower contact rollers 11s and an upper contact roller 72 are mounted on a generally triangularly shaped roller support.

The wheel examining apparatus 3fl includes a box-shaped base or housing 8, within which is disposed a clamp mechanism 9 for supporting the inner contact rollers 11u and the outer contact rollers 11s movable closer together or separated away from each other and rotatable around a vertical axis. As will be made clear later, the support rollers 15f are rotatably mounted on a floating member which is supported to be rotatable freely around a vertical axis and movable translationally in any horizontal direction within limits. Thus, the support rollers 15f and the contact rollers 11 and 72 are provided to be movable relative to each other independently. The housing 8 is slidably mounted on a pair of rails 12 which are fixedly attached to the frame 2 and which extend laterally in a direction perpendicular to the center line CL. Thus, the housing 8 can move in the lateral direction perpendicular to the center line CL as guided by the rails 12. However, an arm 6 integrally provided with the housing 8 is operatively coupled to one end of an equalizer 4f. The other end of the equalizer 4f is operatively coupled to an arm 6 of a housing 8 in the wheel examining apparatus 3fr for the left-hand front wheel. The equalizer 4f has a center pivotal point which is always located at the center line CL, so that the left-hand and right-hand wheel examining apparatuses 3fl and 3fr are automatically located symmetrically with respect to the center line CL at all times.

On the other hand, the clamp mechanism 9 disposed inside the housing 8 supports the contact rollers 11 and 72 to be movable relatively closer together or separated away from each other and rotatable around a vertical axis, and the clamp mechanism 9 is slidably mounted on guide rails disposed inside the housing 8 and operatively coupled to one end of a pantagraph 5f through an arm 7. The other end of the pantagraph 5f is similarly operatively coupled to the clamp mechanism 9 of the wheel examining apparatus 3fr for the right-hand front wheel through an arm 7. Thus, the clamp mechanisms 9 of the respective left-hand and right-hand wheel examining apparatuses 3fr and 3fl are always automatically located symmetrically with respect to the center line CL. As a result, once the left-hand and right-hand wheels Wf have been clamped through the rollers 11 and 72 through these clamp mechanisms 9, the locations of geometrical centers of respective wheels Wf are automatically located symmetrically with respect to the center line CL at all times. Thus, the tread center, or the center location between the left-hand and right-hand wheels, becomes automatically aligned with the center line CL which defines a predetermined reference line. In addition, an angle detector 30f (preferably, an encoder) is provided as coupled to the clamp mechanism 9, so that an inclination angle, such as a toe angle, of wheel Wf can be measured.

At the entrance of the wheel examining apparatus 3fl is disposed a wheel guide apparatus, which, in the present embodiment, includes center rollers 18, first side rollers 19 and second side rollers 20u. The center rollers 18 are provided in a pair and they are arranged in parallel as being partly exposed above the surface on which the wheel Wf runs and extend in the direction of advancement of a vehicle. The first side rollers 19 are rotatably disposed at a first height higher in level than the center rollers 18 and they are arranged to be convergent toward their downstream ends with respect to the direction of advancement of a vehicle. The second side rollers 20u are rotatably supported at a second height higher in level than the first height and they are also arranged to be convergent toward their downstream ends with respect to the direction of advancement of a vehicle. In addition, adjacent to and somewhat inwardly of each of the second side rollers 20u is rotatably disposed an auxiliary roller 20l at the first height. With such a wheel guide apparatus, a wheel can be guided to a predetermined location or area accurately, stably and smoothly along a predetermined path.

Now, referring again FIGS. 1 and 2, the rear wheel examining apparatus 3rl (same for 3rr) will be described. The rear wheel examining apparatus 3rl is generally similar in structure to the above-described front wheel examining apparatus 3fl. In the illustrated embodiment, the rear wheel examining apparatus 3rl differs from the above-described front wheel examining apparatus because it has been particularly modified to examine a wheel having the so-called double wheel or double tire structure.

The rear wheel examining apparatus 3rl also includes inner contact rollers 11u and outer contact rollers 11s (however, in FIG. 1, these rollers are not shown because they are enclosed by a cover 17, and, in FIG. 2, only rollers 11s are shown) and a clamp mechanism (not shown) for supporting these rollers to be able to move closer together or separated away from each other and rotatably around a vertical axis. The wheel examining apparatus 3rl also includes a box-shaped housing 8 which serves as a base and is always operatively coupled to a similar box-shaped housing 8 of the other associated wheel examining apparatus 3rr. In addition, the clamp mechanism disposed in the housings 8 of the respective left-hand and right-hand wheel examining apparatuses 3rl and 3rr are operatively coupled through a pantagraph 5r. The housing 8 of the wheel examining apparatus 3rl is slidably mounted on rails 12 which are fixedly attached to the slider unit 2a on the frame 2. Thus, the housing 8 may move in the lateral or transverse direction as guided by the rails 12. Furthermore, the wheel examining apparatus 3rl includes a pair of support rollers 15r which can support a rear wheel Wr to be examined thereon. In the illustrated embodiment, since it is expected that the rear wheel Wr has the so-called double wheel or double tire structure, the support rollers 15r of the rear wheel examining apparatus 3rl are longer in the longitudinal direction than the support rollers 15r for the front wheel Wf by approximately twice.

Figure 3:
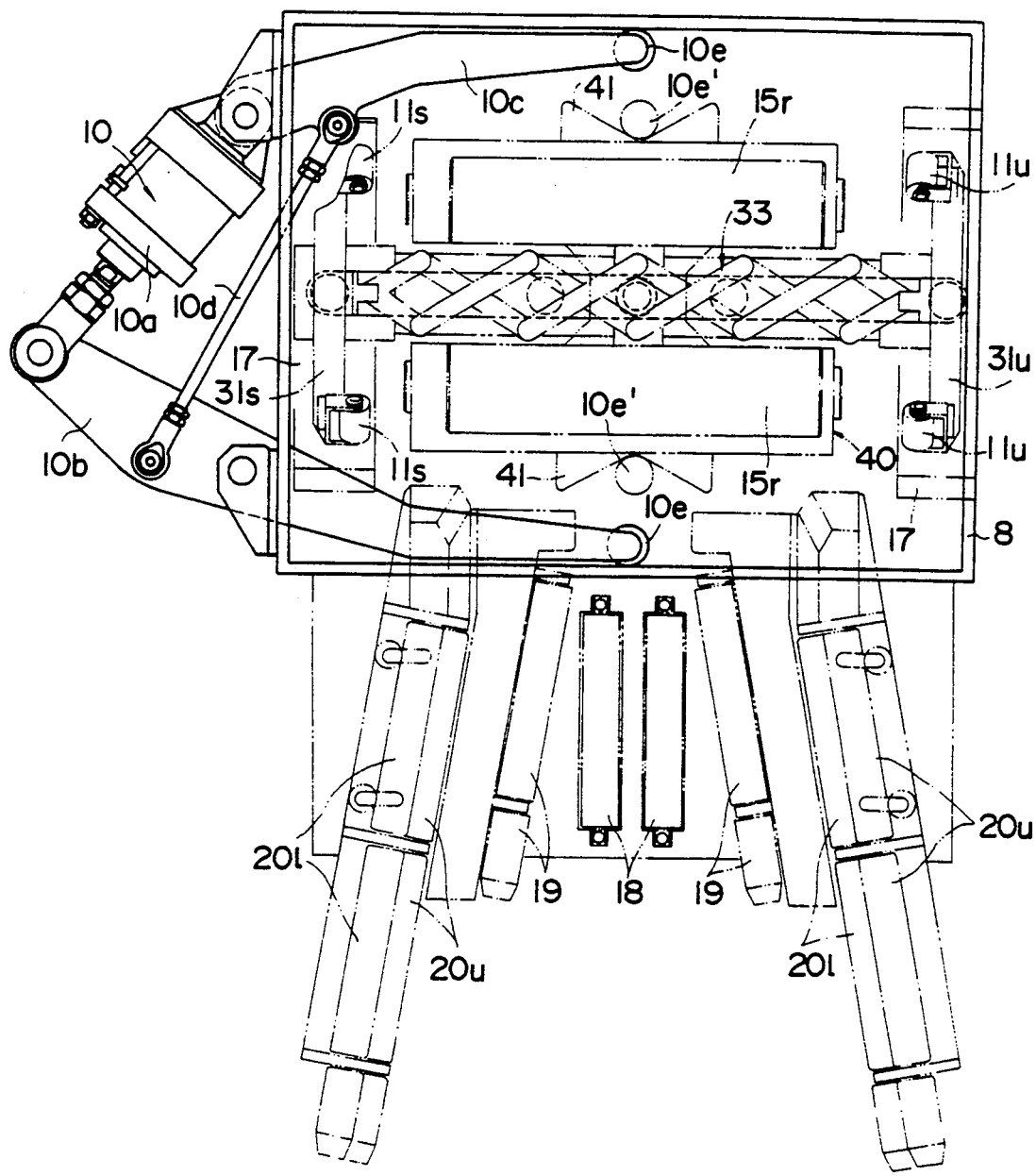
FIG. 3 is a schematic illustration showing in plan view a wheel examining apparatus provided with a wheel guide apparatus constructed in accordance with one embodiment of the present invention provided in the wheel examining system shown in FIGS. 1 and 2.
Figure 4:
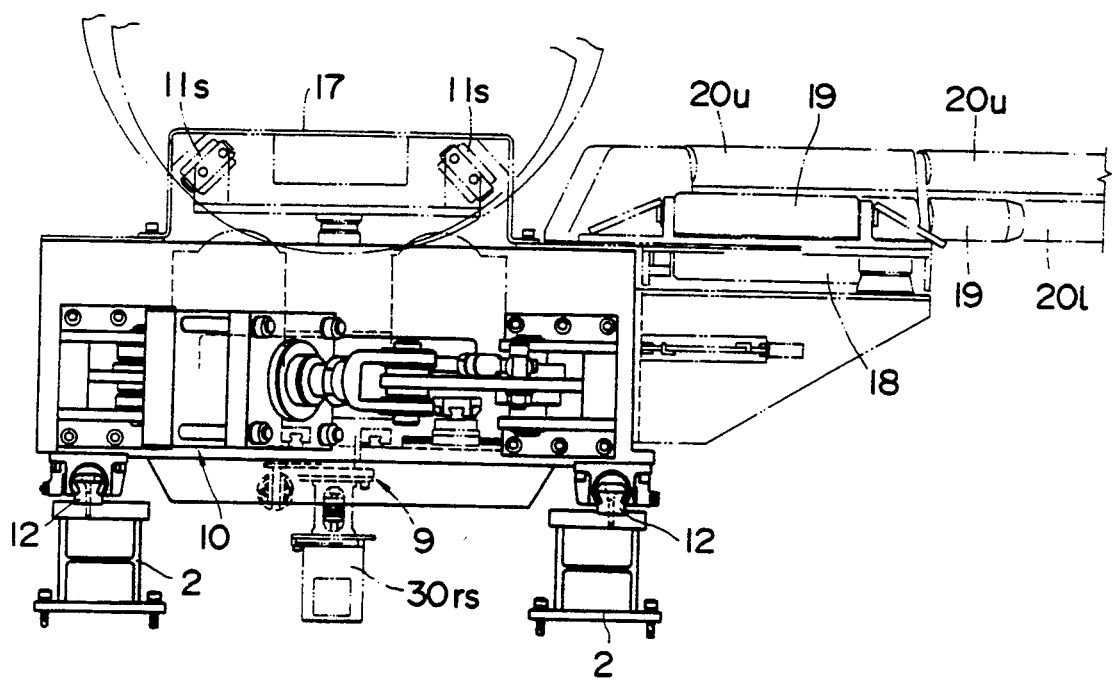
FIG. 4 is a schematic illustration showing in side elevation the wheel examining apparatus shown in FIG. 3.

A wheel guide apparatus constructed in accordance with one feature of the present invention is also provided at the entrance of the rear wheel examining apparatus 3rl. This wheel guide apparatus has a distinctive structure which is constructed such that it can properly and smoothly guide a wheel having the so-called double wheel or double tire structure onto the support rollers 15r. This wheel guide apparatus will be described below in detail with reference to FIGS. 3 and 4 as well as FIGS. 1 and 2.

Figure 5:
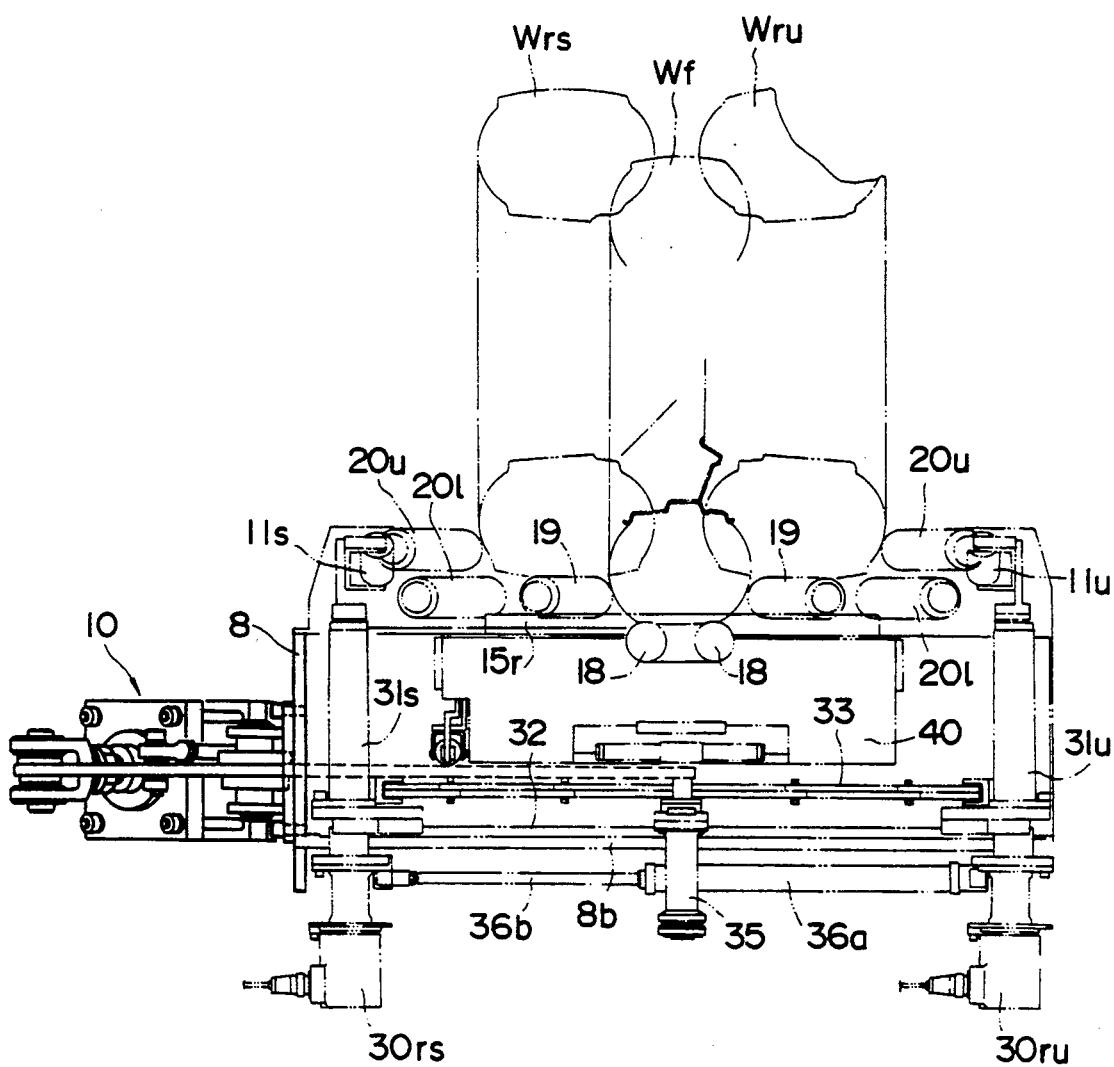
FIG. 5 is a schematic illustration showing in front view the wheel examining apparatus shown in FIG. 3.

The wheel guide apparatus constructed according to one embodiment of the present invention basically includes three kinds of guide rollers 18, 19 and 20 disposed at three different height levels, respectively. In the illustrated embodiment, a pair of center rollers 18 is rotatably provided in parallel with their rotating axes extending in parallel with the direction of advancement of a vehicle. In the illustrated embodiment, the center rollers 18 are arranged symmetrically with respect to a predetermined reference center line. It is to be noted the center rollers 18 can be only one or three or more, if desired. As best shown in FIG. 5, the center rollers 18 are arranged generally at the same level with the surface on which the wheels run; however, in a preferred embodiment, the center rollers 18 are arranged to be partly exposed and thus somewhat project above the surface on which the wheels run. Thus, when a wheel runs on the center rollers 18, a relative movement between the wheel and the wheel guide apparatus can be provided freely in the lateral or transverse direction, so that a relative position between the wheel and the wheel guide apparatus can be determined at a desired location. The center rollers 18 are preferably arranged to be in parallel with the horizontal surface.

On both sides of the center rollers 18 are arranged the first side rollers 19 rotatably. As clear from FIG. 5, the first side rollers 19 are arranged at the first height higher in elevation than the center rollers 18. Moreover, the first side rollers 19 are arranged such that they are convergent toward their downstream ends with respect to the direction of advancement of a vehicle through the wheel guide apparatus, so that the left-hand and right-hand first side rollers gradually become closer together from their upstream ends toward their downstream ends. Preferably, the first side rollers 19 are inclined such that the angle defined by the left-hand and right-hand first side rollers would not exceed 30°, and most preferably, this angle is set around 15°. In addition, in a preferred embodiment, the distance between the downstream ends of the left-hand and right-hand first side rollers 19, which is the smallest distance between the left-hand and right-hand first side rollers 19, is set equal to or slightly smaller than the width of the front wheel Wf. If the first side rollers 19 are substantially longer than the radius of the wheel Wf, the first side rollers 19 are preferably segmented. The length of each of the segments is preferably set on the order of the radius of the wheel Wf or smaller. In the illustrated embodiment, the first side rollers 19 are arranged in parallel with the horizontal surface; however, if desired, the rollers 19 may also be arranged to be inclined downwardly toward their downstream ends, in which case the height level of the first side rollers 19 gradually decrease from their upstream ends toward their downstream ends. In the latter case, the angle defined between the horizontal surface and the first side rollers 19 is preferably set in a range between 0° and 15°. In a preferred embodiment, the left-hand and right-hand first side rollers 19 are arranged symmetrically with respect to the center reference line of the center rollers 18.

A plurality of second side rollers 20u are rotatably provided outwardly of the first side rollers 19. In the illustrated embodiment, the second side rollers 20u are arranged convergently to define an angle similar to that of the first side rollers 19; however, if desired, the second side rollers 20u may be arranged with a lateral inclination to define an angle different from that of the first side rollers 19. As best shown in FIG. 5, the second side rollers 20u are arranged at the second height higher in elevation than the first height. In the illustrated embodiment, taking the wheel running surface, which is normally a floor, as a reference, the second height is approximately twice the elevation of the first height. However, the first and second heights may be set at any desired levels. Since the second side rollers 20u are relatively long, they are segmented and each of the segments has a length which is preferably set to be equal to or slightly smaller than the radius of the rear wheel Wr. In addition, the distance between the downstream ends of the left-hand and right-hand second side rollers 20u is set at a value which is equal to or slightly less than the width of the rear wheel Wr, which has the so-called double wheel or double tire structure in the illustrated example.

In the illustrated embodiment, a plurality of auxiliary rollers 20l are also provided and each of the auxiliary rollers 20l is rotatably arranged adjacent to and slightly inwardly of its corresponding second side roller 20u in parallel therewith. As is clear from FIG. 5, the auxiliary rollers 20l are arranged at the first height and in parallel with the respective corresponding second side rollers 20u. These auxiliary rollers 20l provide an additional running surface for the rear wheel Wr having the so-called double wheel or double tire structure and also an additional guiding function, so that the wheel guiding function is significantly enhanced.

In operation, as shown in FIG. 1, when a vehicle enters in a direction indicated by the arrow A, its front wheels Wf are first guided by the respective wheel guide apparatuses and pass through the rear wheel examining apparatuses 3rl and 3rr. In this case, as shown in FIG. 5, when the front wheels Wf come into contact with the second side rollers 20u and auxiliary rollers 20l or the first side rollers 19, the housings 8 move laterally in the direction perpendicular to the center line CL if there is any discrepancy in positional relationship between them in the lateral direction. In this instance, since the left-hand and right-hand housings 8 are operatively coupled through the common equalizer 4r, the left-hand and right-hand wheel examining apparatuses 3rr and 3rl move symmetrically in synchronism. In this manner, the left-hand and right-hand wheel examining apparatuses 3rr and 3rl are aligned with the respective left and right front wheels Wf through a cooperation of the present wheel guide apparatuses as the wheels Wf advance in the direction indicated by the arrow A. Then, as shown in FIG. 5, when the wheel Wf comes to ride on the center rollers 18, since a lateral relative movement between the wheel Wf and the center rollers 18 can be easily provided, the wheel Wf comes to be more aligned with a corresponding one of the wheel examining apparatuses 3rr and 3rl. In this instance, the first side rollers 19 may participate in bringing the wheel Wf in alignment with the corresponding wheel examining apparatus. In particular, since the left-hand and right-hand first side rollers 19 are arranged inclined and convergent and the distance between the downstream ends of the left-hand and right-hand side rollers 19 is set to a value equal to or slightly smaller than the width of the wheel Wf, the wheel Wf comes to be located substantially at the center of the support rollers 15r of the wheel examining apparatus 3rr or 3rl.

Figure 16:
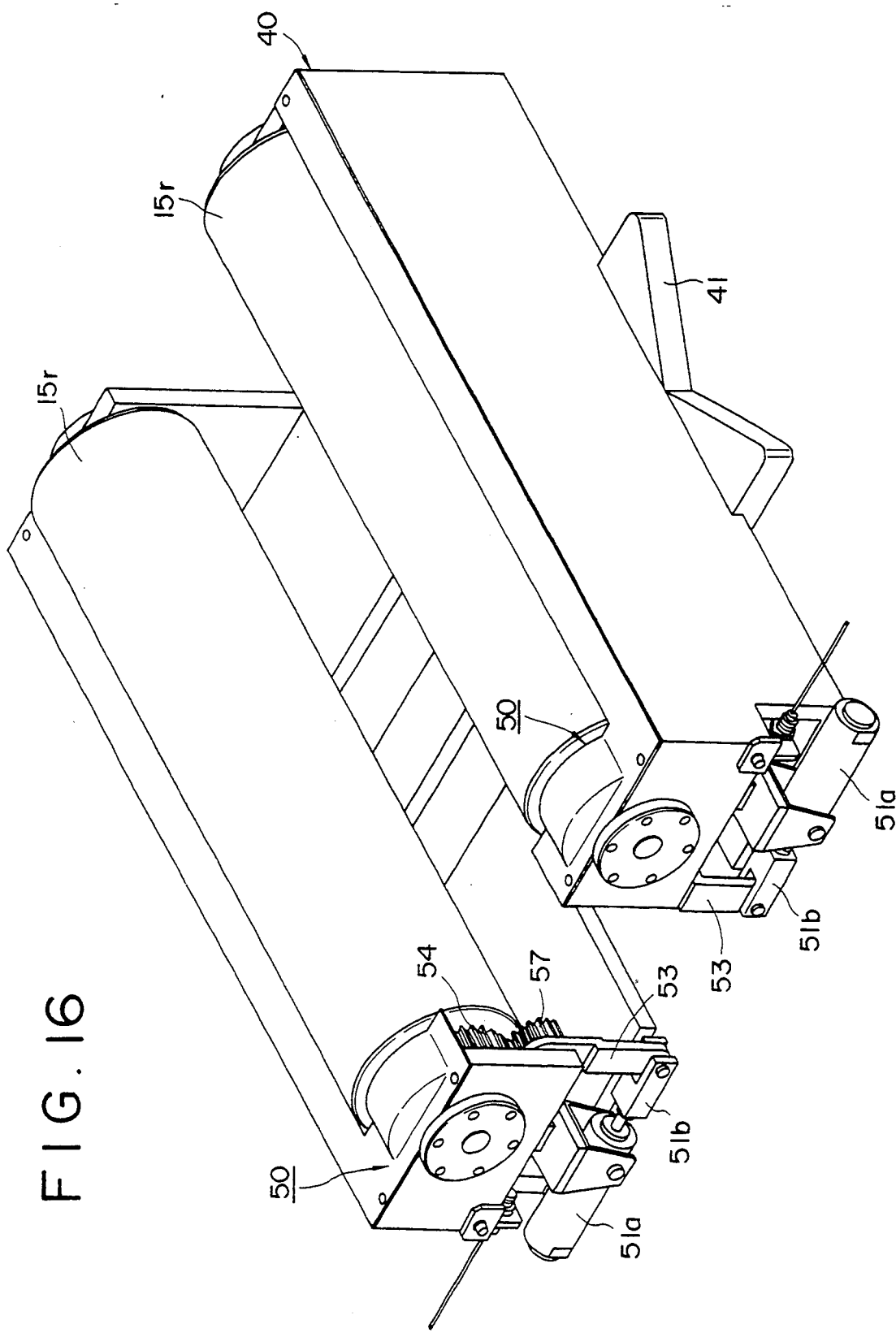
FIG. 16 is a schematic illustration showing in perspective view the overall structure of a support roller assembly provided in the wheel examining apparatus shown in FIG. 10.
Figure 17:
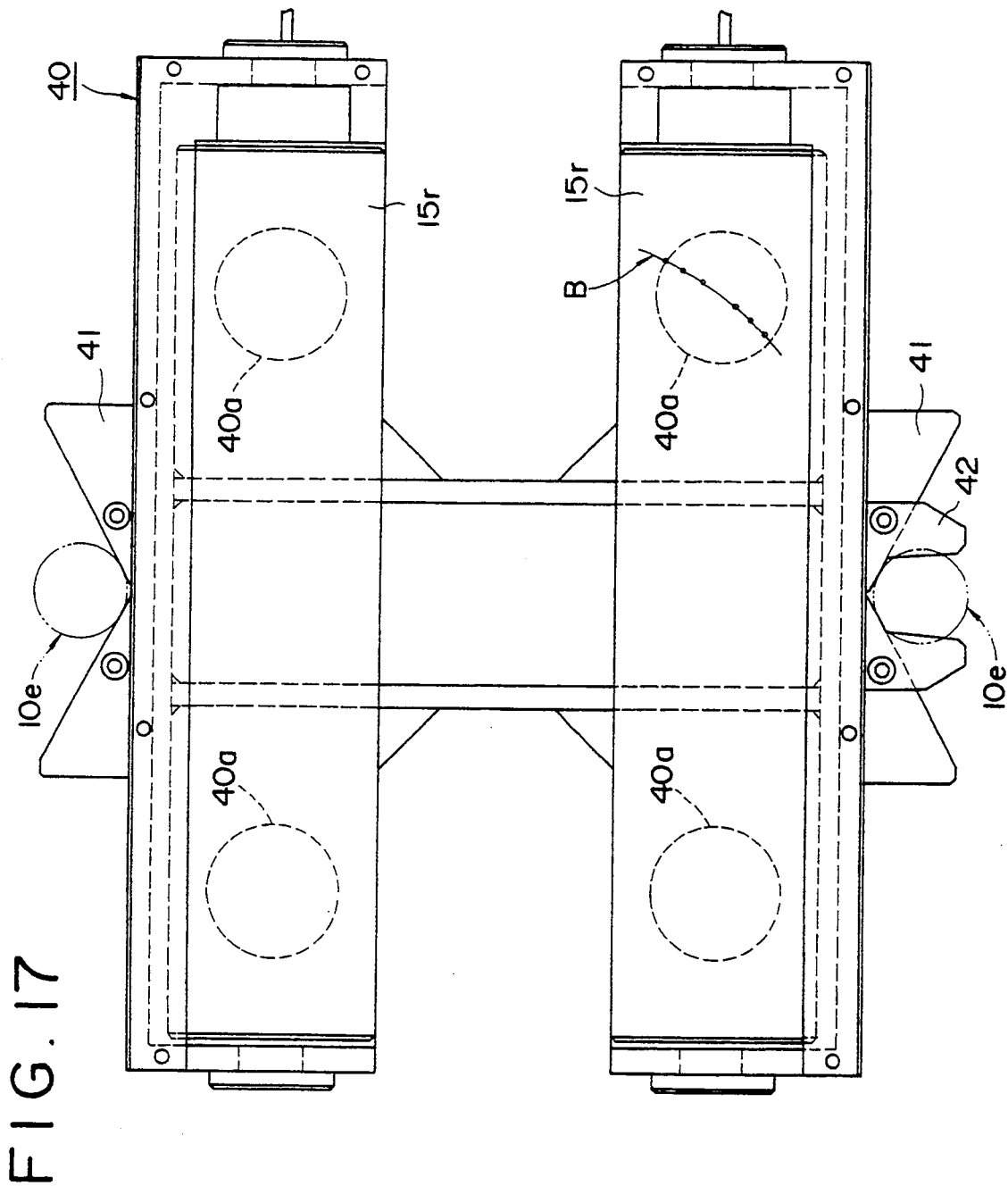
FIG. 17 is a schematic illustration showing in plan view the support roller assembly shown in FIG. 16.
Figure 18:
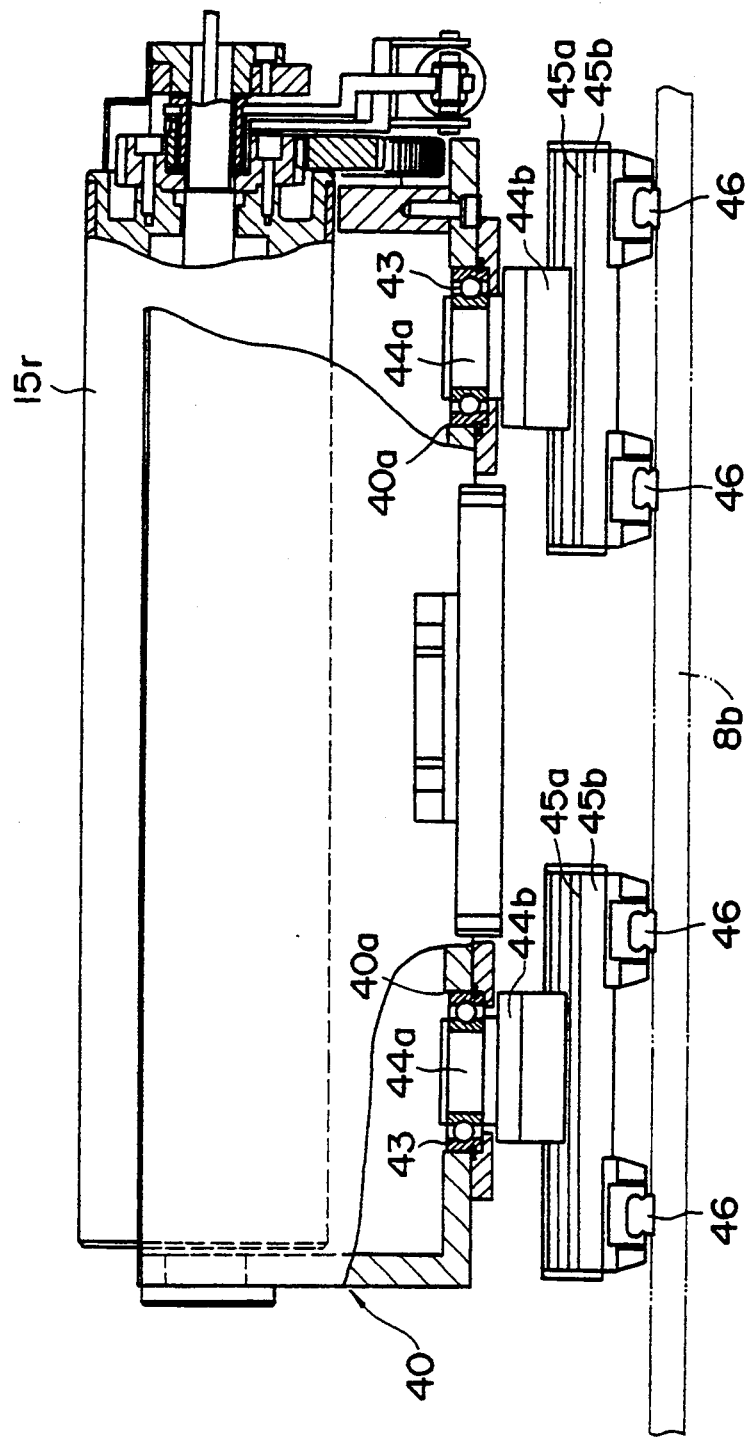
FIG. 18 is a schematic illustration showing in front view with parts removed the support roller assembly shown in FIG. 16.
Figure 19:
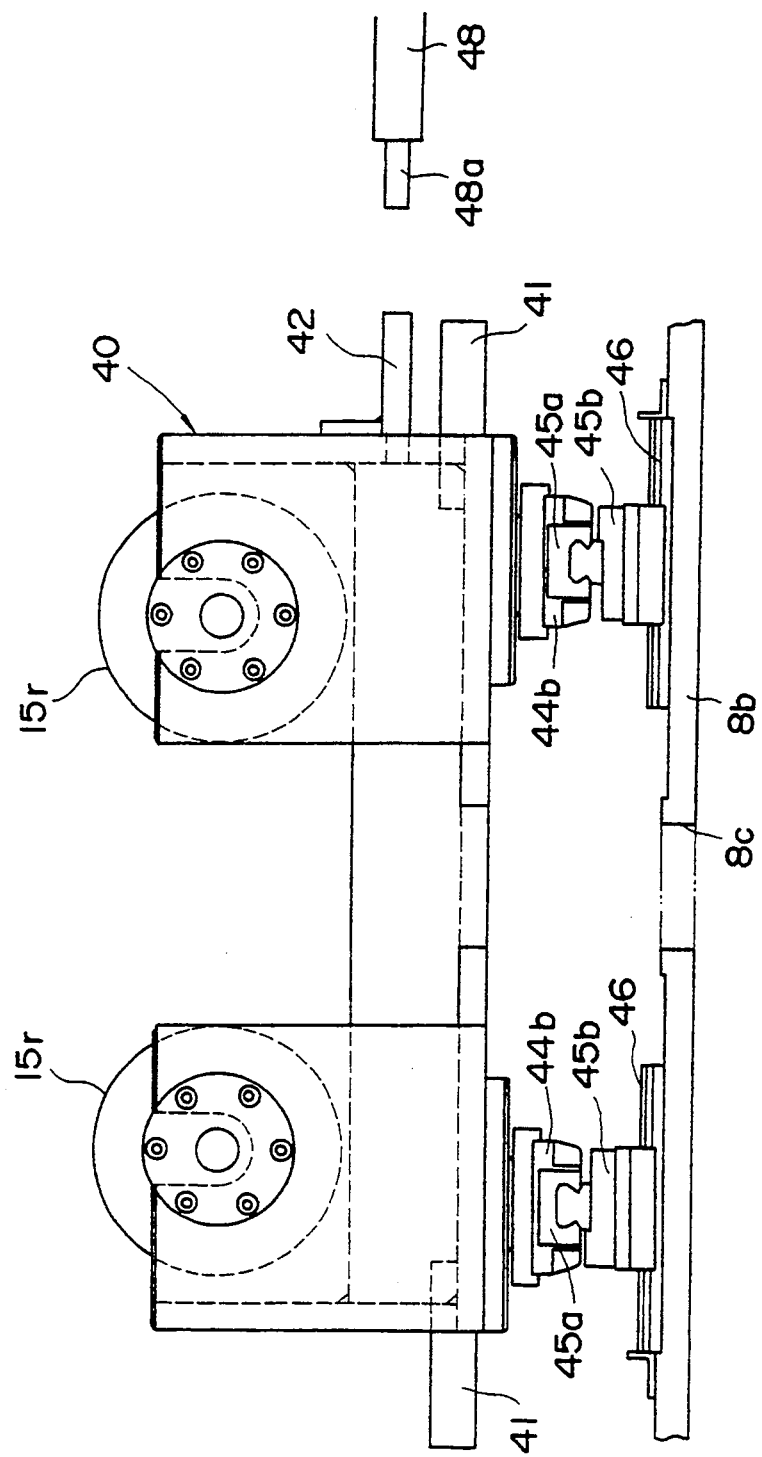
FIG. 19 is a schematic illustration showing in right-hand side elevation the support roller assembly shown in FIG. 16.
Figure 20:
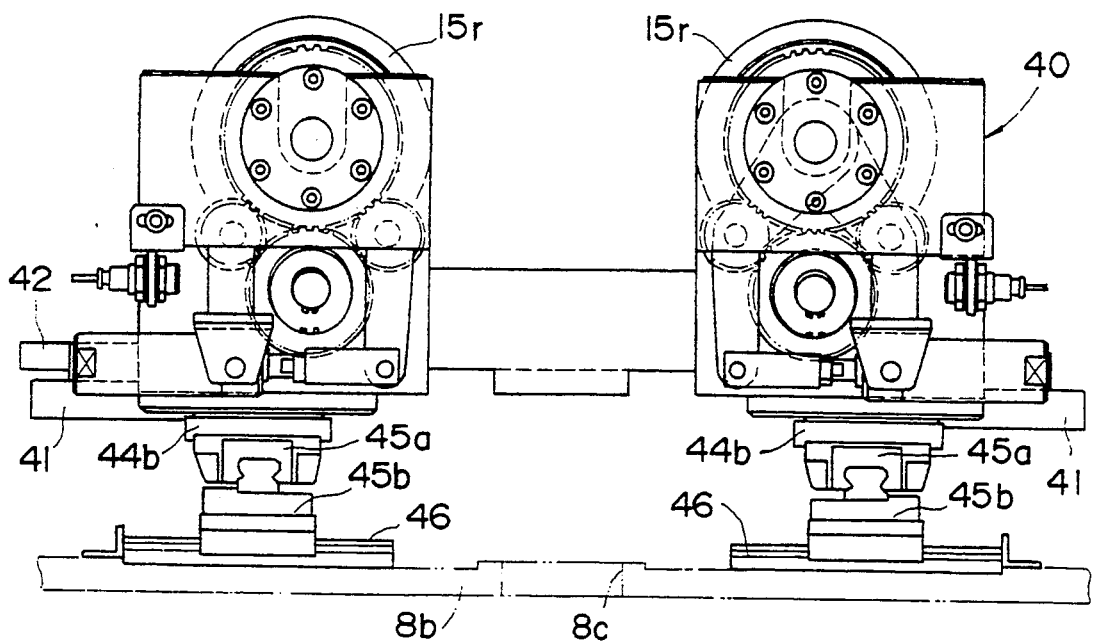
FIG. 20 is a schematic illustration showing in left-hand side elevation the support roller assembly shown in FIG. 16.
Figure 21:
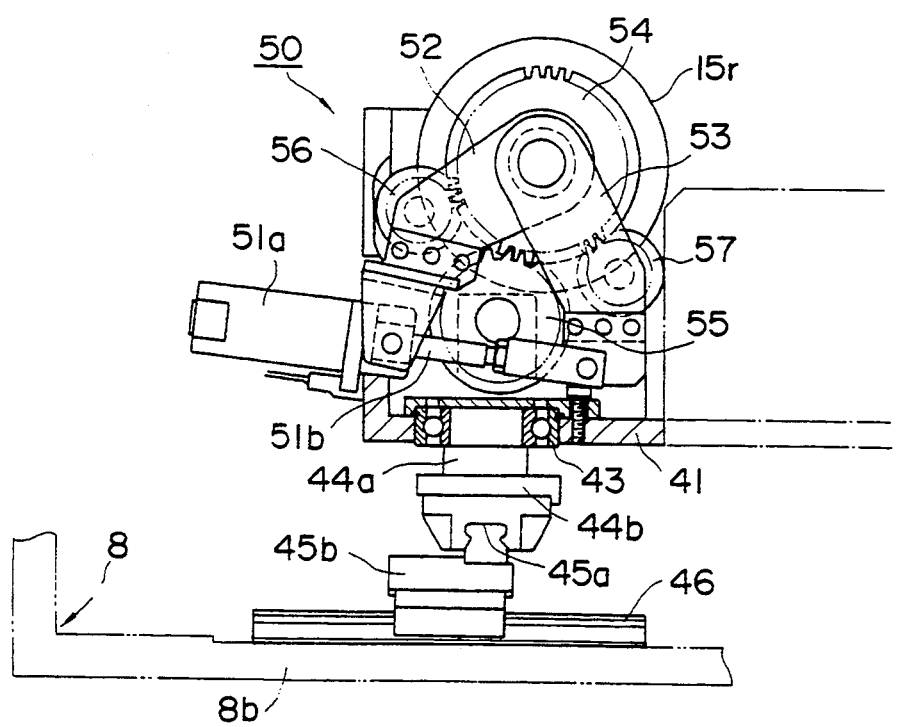
FIG. 21 is a schematic illustration showing a roller lock apparatus incorporated in the support roller assembly.

As the vehicle advances further in the direction indicated by the arrow A, the wheels Wf pass through the rear wheel examining apparatuses 3rr and 3rl. In this instance, since the wheel examining apparatuses 3rr and 3rl are locked by a lock device 10, the support rollers 15r are fixed in position with respect to the housing 8. Moreover, the support rollers 15r themselves are locked in a non-rotating state by a roller lock device 50 (FIG. 16). Then, the rear right-hand and left-hand wheels Wr of the vehicle enter the rear wheel examining apparatuses 3rr and 3rl, respectively. It is to be noted that the rear wheel Wr in this example has the so-called double wheel or double tire structure, so that, as shown in FIG. 5, the rear wheel Wr includes a pair of inner and outer sub-wheels or tires Wrs and Wru which are mounted on the same axle side-by-side. Thus, when the rear wheel Wr advances, since its width is larger than the width of the entrance of the first side rollers 19, the wheel Wr rides on the first side rollers 19o In this case, if the rear wheel Wr is shifted in position to the left or right, the rear wheel Wr first comes into contact with either of the left-hand and right-hand second side rollers 20u and/or its associated auxiliary roller 20l, and, thus, the wheel examining apparatuses 3rr and 3rl are shifted in position sideways symmetrically with respect to the center line CL so as to bring them in alignment with the respective rear wheels Wr. Since the rear wheel Wr rides on the first side rollers 19, a relative movement between the rear wheel Wr and its associated wheel examining apparatus 3rr or 3rl can be provided easily, and, as a result, the positional alignment between the wheel Wr and its associated wheel examining apparatus 3rr or 3rl can be carried out extremely smoothly and stably. Consequently, the wheel Wr comes to be accurately aligned with a corresponding one of the wheel examining apparatuses 3rr and 3rl with the aid of the present wheel guide apparatus, so that the rear wheel Wr is positioned on the corresponding support rollers 15r in a substantially aligned state.

Figure 6:
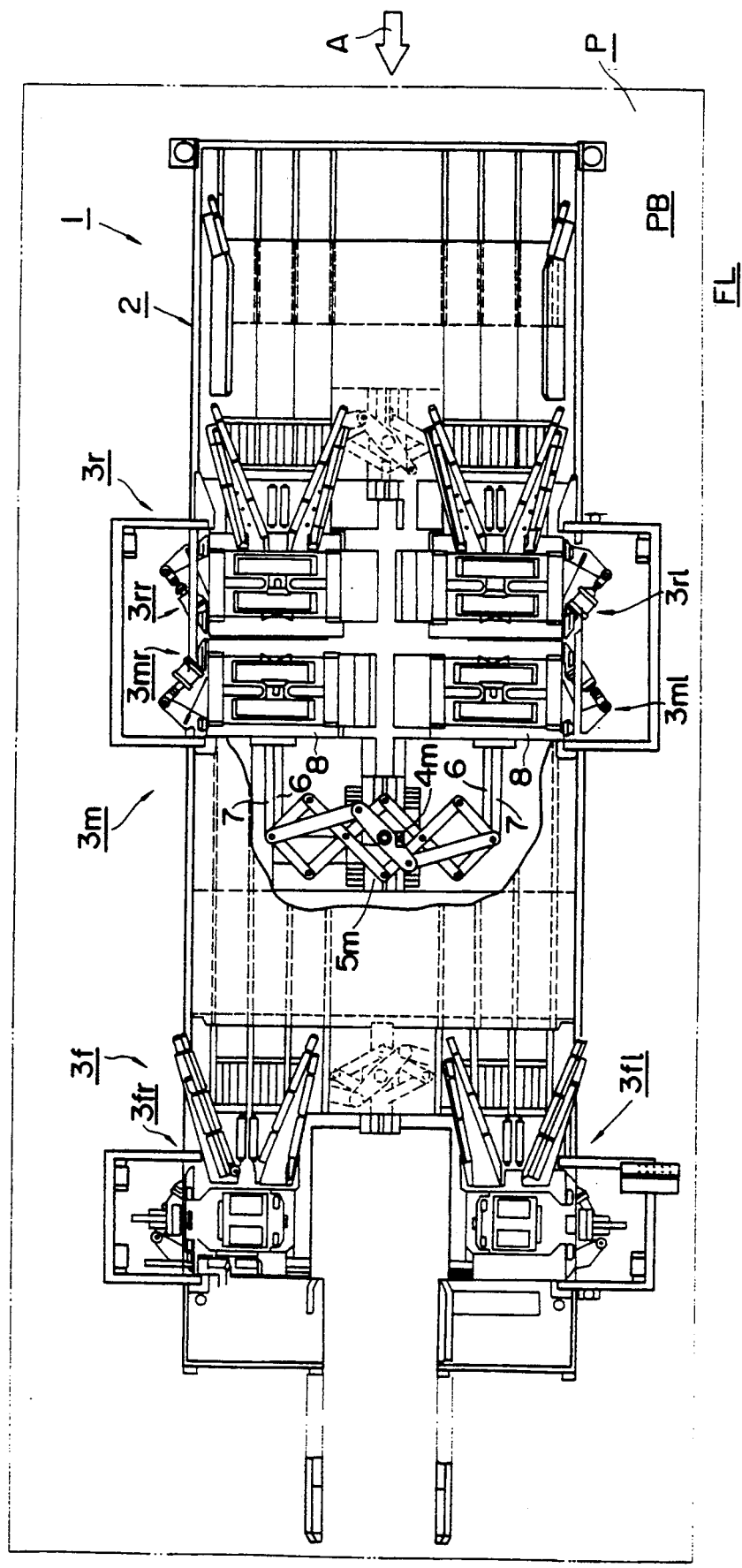
FIG. 6 is a schematic illustration showing in plan view a wheel examining system for tri-axle vehicles constructed in accordance with one embodiment of the present invention.
Figure 7:
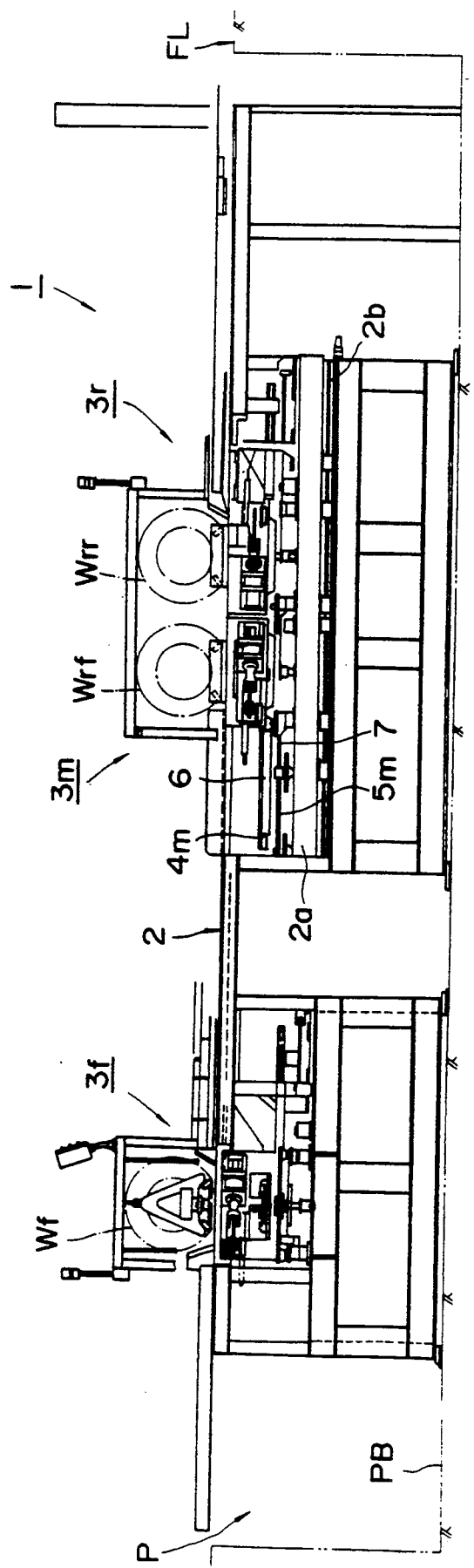
FIG. 7 is a schematic illustration showing in front view the wheel examining system shown in FIG. 6.

Now, particularly with reference to FIGS. 6 through 9, a wheel examining system for examining the wheel alignment of a three axle vehicle constructed in accordance with another embodiment of the present invention will be described in detail below. As shown in FIG. 6, in this wheel examining system 1, a vehicle to be examined enters into the system by travelling from the left to the right in FIG. 6 in the direction indicated by the arrow A. Since the wheel examining system 1 for three axle vehicles shown in FIGS. 6 through 9 is structurally similar in many respects to the wheel examining system 1 for two axle vehicles shown in FIGS. 1 and 2, similar elements are indicated by similar reference numerals. In the present embodiment for three axle vehicles, in addition to a front wheel examining section 3f for the front wheels (first axle) and a rear wheel examining section 3r for the rear wheels (second axle), an intermediate wheel examining section 3m for the intermediate wheels (third axle) is also provided. Here, it is to be noted that the rear and intermediate wheel examining sections 3r and 3m are so structured to examine wheels Wr having the so-called double wheel or double tire structure. Thus, the support rollers 15r in each of these rear and intermediate wheel examining sections 3r and 3m are structured to have enough width to support thereon a wheel Wr having such a double wheel or double tire structure.

As shown in FIGS. 6 through 9, the intermediate wheel examining section 3m is located adjacent to the rear wheel examining section 3r, and an equalizer 4r and a pantagraph 5r for operatively coupling a pair of left-hand and right-hand wheel examining apparatuses 3rr and 3rl in the rear wheel examining section 3r are located at the upstream side of the rear wheel examining section 3r with respect to the direction of advancement of a vehicle through the system 1 as indicated by the arrow A. On the other hand, an equalizer 4m and a pantagraph 5m for operatively coupling a pair of left-hand and right-hand wheel examining apparatuses 3mr and 3ml in the intermediate wheel examining section 3m are located at the downstream side thereof with respect to the direction of advancement of a vehicle. With this arrangement, the rear and intermediate wheel examining sections 3r and 3m can be located closely adjacent to each other, and yet both of the wheel examining sections 3r and 3m may be constructed relatively low in level.

Although the intermediate and rear wheel examining sections 3m and 3r are substantially symmetrical in structure with respect to a transverse line passing through the center between the two sections 3m and 3r, only the rear wheel examining section 3r is provided with a wheel guide apparatus at its entrance. Since the intermediate wheel examining section 3m is provided in parallel with and adjacent to the rear wheel examining section 3r, it is not necessary to provide such a wheel guide apparatus to the intermediate wheel examining section 3m. With such a wheel examining system for three axle vehicles, a wheel examination can be carried out for each of the three axles simultaneously and independently from one another. Besides, it is often the case in a three axle vehicle that the wheels on the intermediate and rear axles have the so-called double wheel or double tire structure so as to be able to support a heavy load. Even in such a case, with the present system, any examination, such as measuring of an inclination angle, can be carried out for each of the wheels or tires on each of the axles individually.

Figure 8:
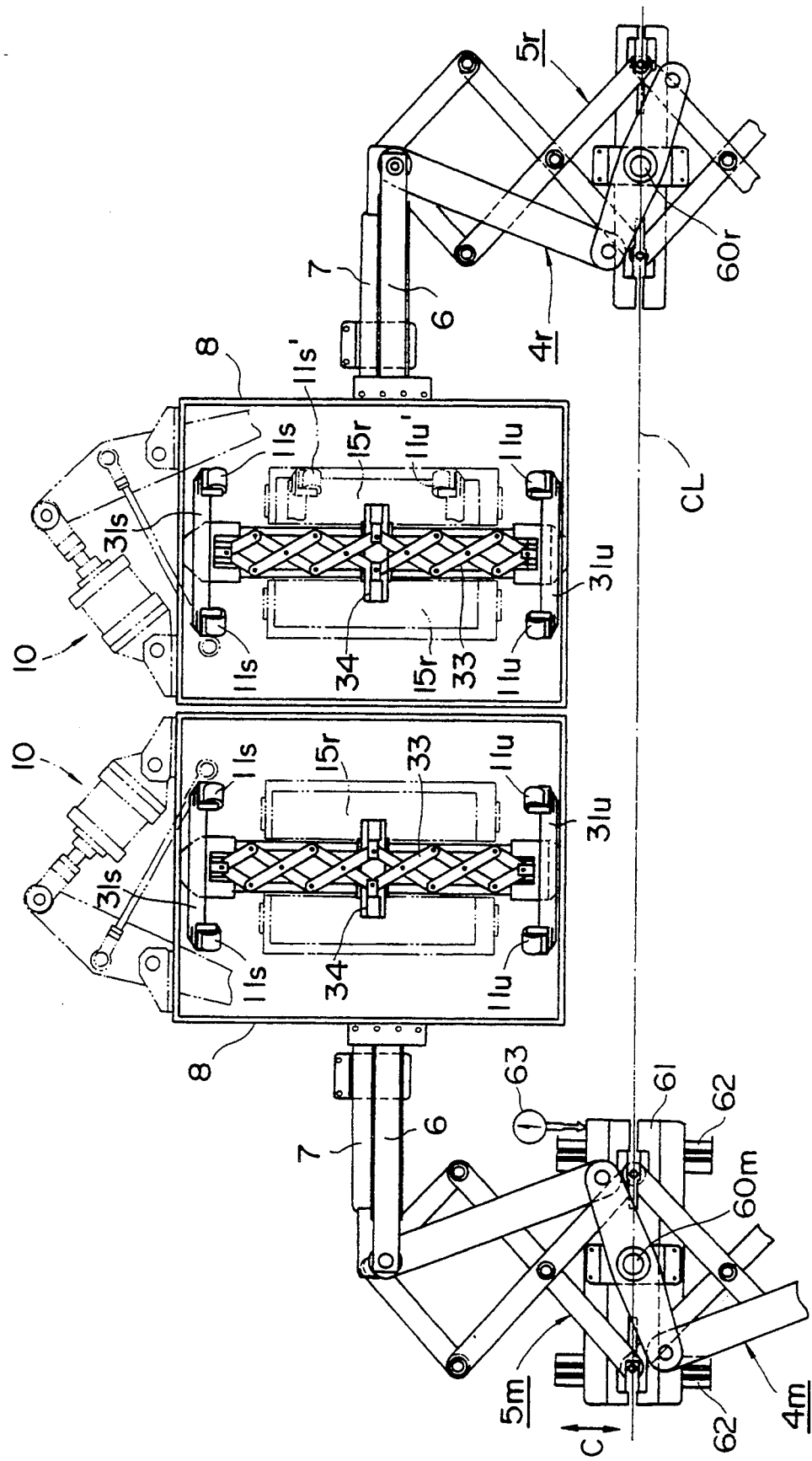
FIG. 8 is a schematic, fragmentary illustration showing on an enlarged scale the arrangement of the wheel examining apparatuses for right-hand wheels of both of intermediate and rear wheels in the wheel examining system shown in FIG. 6.
Figure 9:
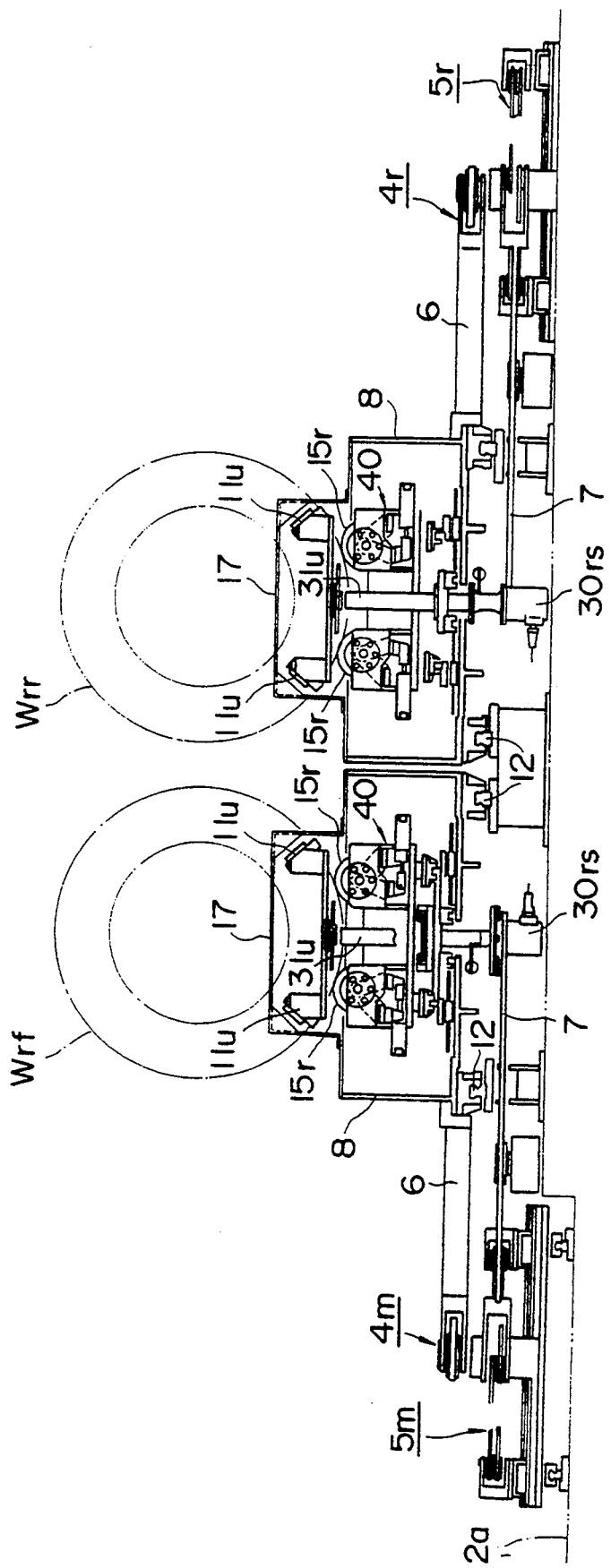
FIG. 9 is a schematic illustration showing in front view the structure shown in FIG. 8.

With reference to FIGS. 6 and 8, a particular feature of the present three axle vehicle wheel examining system according to the present invention will be described below. In the wheel examining system shown in FIGS. 6 and 8, an interconnecting (or center positioning) means of each of the front and rear wheel examining sections 3f and 3r has a fixed or immovable center position on the frame 2. This interconnecting or center positioning means includes a pantagraph 5f or 5r which operatively couples left-hand and right-hand wheel clamp means, and the pantagraphs 5f or 5r has a stationary center point 60f (not shown) or 60r on the frame 2. Thus, a hypothetical straight line connecting these two stationary center points 60f and 60r defines the reference center line CL of the present examining system. Described more in detail, when the slider unit 2a is set in its unlocked state, the center point 60r is set freely movable along the reference center line CL; whereas, when the slider unit 2a is set in its locked state, the center point 60r is fixed in position on the frame 2.

With the above-described structure, when a wheel is clamped by rollers 11s and 11u from both sides, the center of the wheel is brought into alignment with the center of the clamp means and at the same time the left-hand and right-hand wheels are located symmetrically with respect to the reference center line CL through the pantagraphs 5r and 5f. In addition, the left-hand and right-hand housings 8 are always located symmetrically with respect to the reference center line CL through the equalizer 4. Since a relative motion is possible between the clamp means and the housing 8, the center of the housing 8 is not necessarily in agreement with the center of the clamp means.

On the other hand, the center position of pantagraph 5m which serves as an interconnecting or center positioning means of the intermediate wheel examining section 3m is set on a slider unit 61. That is, a pair of guide rails 62 (FIG. 8) is provided on the frame 2 extending in a direction perpendicular to the reference center line CL. And, the slider unit 61 is slidably mounted on these guide rails 62. The pantagraph 5m and the equalizer 4m have their center positions set on the slider unit 61. Thus, the pantagraph 5m and the equalizer 4m may shift in position either to the left or to the right in the direction indicated by the arrow C with respect to the reference center line CL by the slider unit 61.

Accordingly, if the tread centers of the three axles of a vehicle are not aligned on a common straight line, the center line of its vehicle is defined by the tread centers of the front and rear wheel axles only and this center line is brought into alignment with the reference center line CL in the present examination system. In this case, although the tread center of the intermediate axle for the intermediate wheels becomes shifted either to the left or to the right from the reference center line CL, the amount of such a shift can be advantageously absorbed by a relative movement between the slider unit 61 and the rails 62. As a result, even in the case of a three axle vehicle, the inclination angle of each of its wheels can be measured at high accuracy with respect to a predetermined reference line. In addition, by measuring the amount of shift of the slider unit 61 from the reference center line CL by a meter 63, interaxle slip, i.e., the amount of discrepancy among the tread centers can be measured.

In the embodiment shown in FIGS. 6 and 8, the interconnecting or center positioning means of the intermediate wheel examining section 3m is structured to be movable in the transverse direction; however, it can also be so structured that the interconnecting or center positioning means of either or both of the front and rear wheel examining sections 3f and 3r is shiftable to the left and to the right. In addition, it may also be so structured that the interconnecting or center positioning means of all of the three wheel examining sections are shiftable in position and can be locked in a desired location selectively. Furthermore, the basic concept of the present invention is equally applicable to a wheel examining system for vehicles having four or more axles.

Now, a description will be had with respect to another feature of the present invention, i.e., a novel double encoder structure, which allows to measure the inclination angle of each of the opposite side surfaces of each wheel independently from each other and at the same time. This feature is particularly useful for the case for measuring the inclination angle of a wheel having the so-called double wheel or double tire structure.

Figure 10:
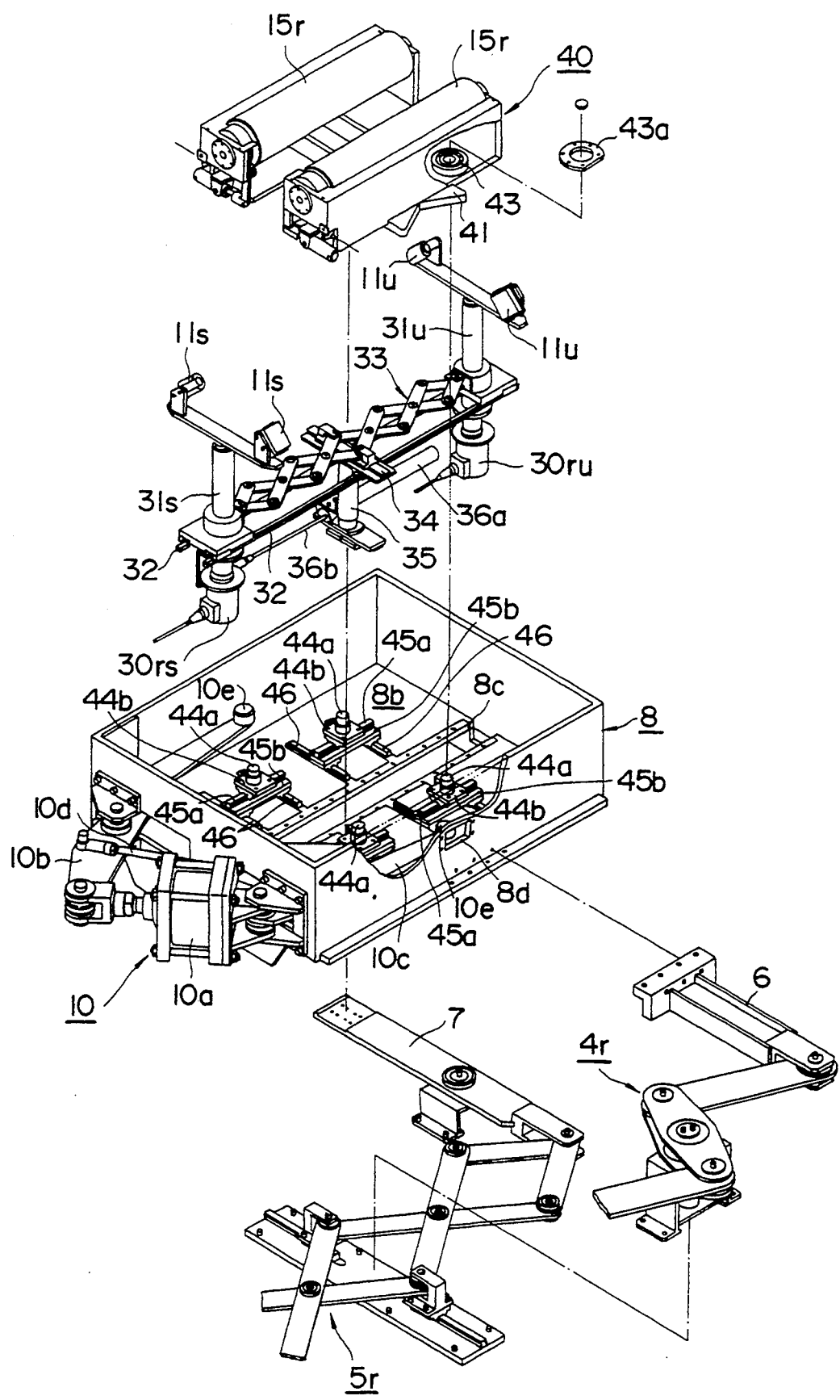
FIG. 10 is an exploded and perspective view showing a wheel examining apparatus constructed in accordance with one embodiment of the present invention and provided in the wheel examining system shown in FIGS. 1 through 6.
Figure 11:
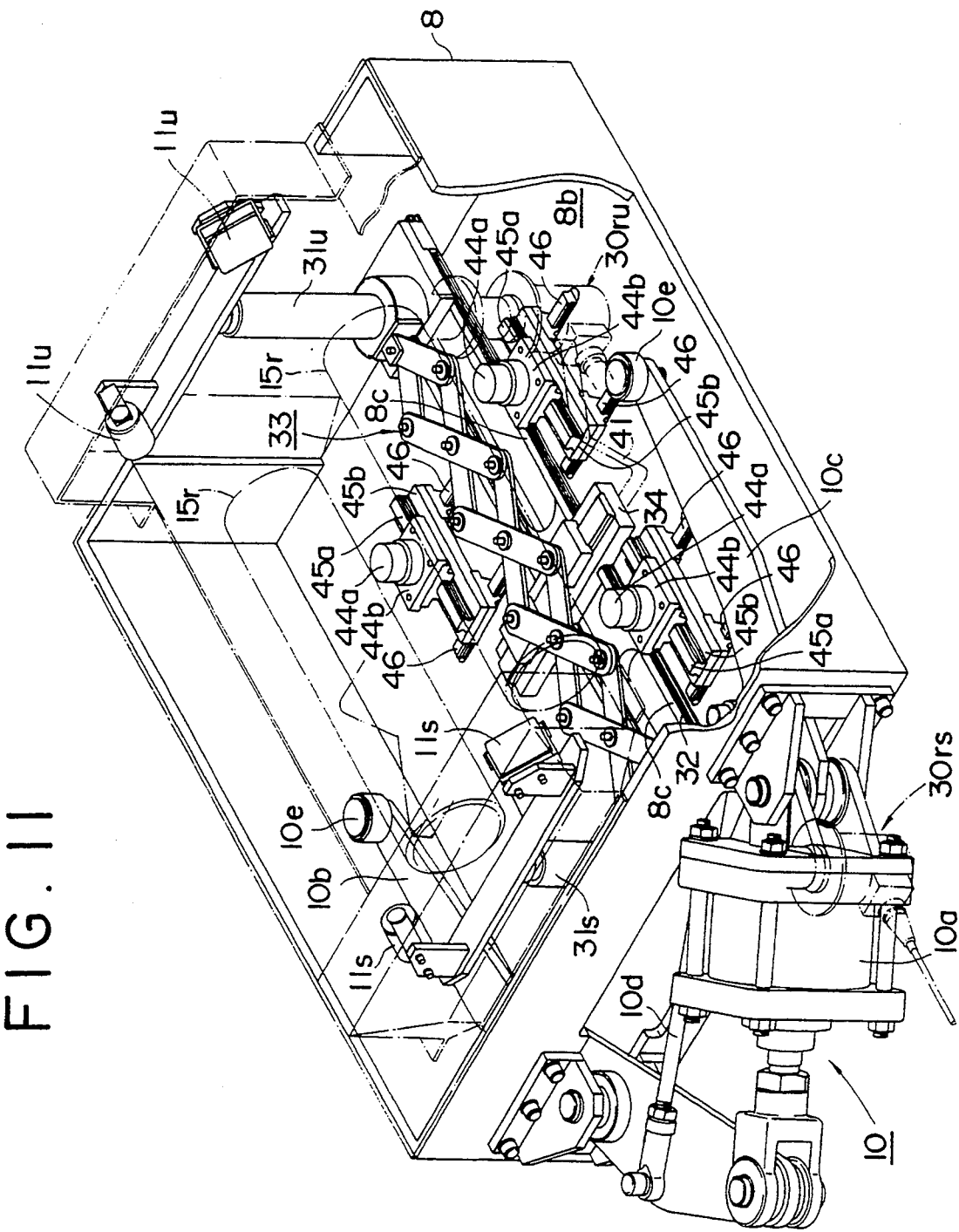
FIG. 11 is a schematic illustration showing on an enlarged scale the arrangement of various components within a housing of the wheel examining apparatus shown in FIG. 10.

In the first place, referring to FIGS. 10 and 11, the detailed internal structure of a wheel examining apparatus 3 for either of rear or intermediate wheels, which can be provided in either of the two axle vehicle wheel examining system 1 shown in FIGS. 1 and 2 and the three axle vehicle wheel examining system 1 shown in FIGS. 6 through 9, is shown. If the front wheels of a vehicle also have the so-called double wheel or double tire structure, this wheel examining apparatus 3 can be applied also to such front wheels.

As shown in FIG. 10, the wheel examining apparatus 3 includes a box-shaped housing 8, which serves as a base, and the housing 8 is mounted on rails 12 extending in the transverse direction perpendicular to the reference center line CL to be slidably movable either to the left or to the right, as described before. The housing 8 is operatively coupled to one end of an equalizer 4r through an arm 6. The housing 8 includes a bottom plate 8b which is formed with an opening 8c rectangular in cross section approximately at its center, and a guide rail 32 is laid down along each side of the opening 8c. On the guide rails 32 are slidably mounted a pair of inner and outer roller supports 31u and 31s. The inner roller support 31u generally has a "T" shape and supports a pair of inner contact rollers 11u rotatably on top thereof. The inner roller support 31u has a generally "T" shaped support section, which is rotatably mounted on a slider unit which in turn is engaged with the guide rails 32. The amount of relative rotating angle between the support section and the slider unit can be detected by an inner angle detector 30ru which is provided in association with the inner roller support 31u. Preferably, the angle detector 30ru is a rotary encoder.

Similarly, the outer roller support 31s supports a pair of outer contact rollers 11s rotatably at its top. The outer roller support 31s has a generally T-shaped support section which is rotatably mounted on a slider unit which in turn is engaged with guide rails 32. The amount of relative rotation between the support section of the support 31s and the slider unit can be detected by an outer angle detector 30rs which is provided in association with the outer roller support 31s. Preferably, the angle detector 30rs is also a rotary encoder. Thus, the inner and outer contact rollers 11u and 11s are supported to be movable closer to each other or separated away from each other and also freely rotatable around a vertical axis.

The inner and outer roller supports 31u and 31s are operatively coupled as being coupled to the opposite ends of a clamping pantagraph 33. Moreover, a center plate 34 is mounted at a mid-point of the clamping pantagraph through a combination of rails and a slider unit. Thus, independently of expanding and contracting operation of the pantagraph 33, the center plate 34 on which rails are provided is always maintained at the center position of the pantagraph 33. The center plate 34 itself is slidably mounted on the guide rails 32 as a slider unit so that it can move either to the left or to the right. Accordingly, the center plate 34 is always maintained at a center position between the inner and outer contact rollers 11u and 11s, thereby defining the position of a geometrical center of the roller clamp mechanism. Integrally mounted on and extending under the center plate 34 is a center column 35, which extends downward to the exterior through an opening 8c formed in the bottom plate 8b of the housing 8 and is operatively coupled to the pantagraph 5r through an arm.

Figure 12:
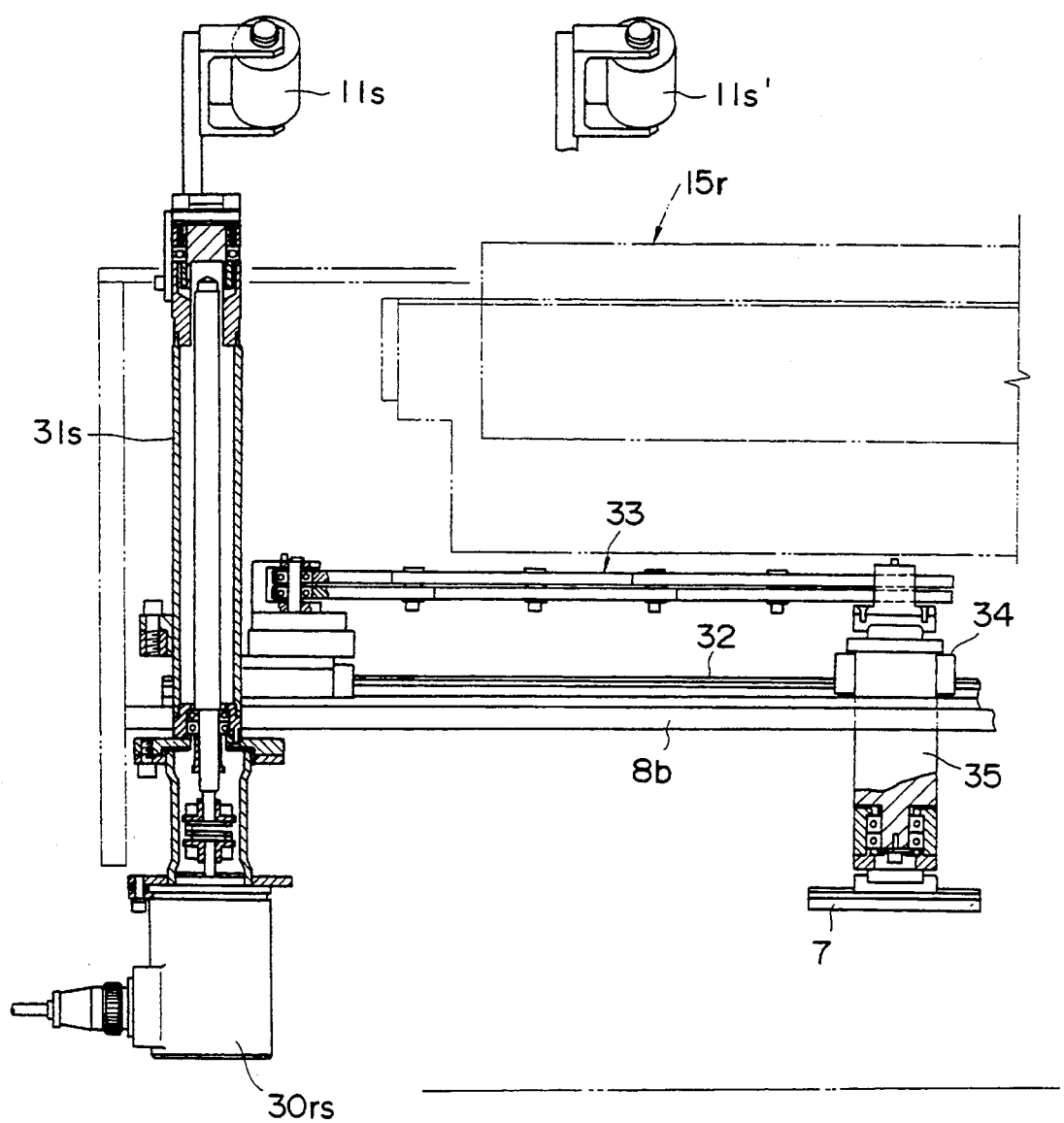
FIG. 12 is a schematic illustration showing on an enlarged scale a part of the structure of the wheel examining apparatus shown in FIG. 10.
Figure 13:
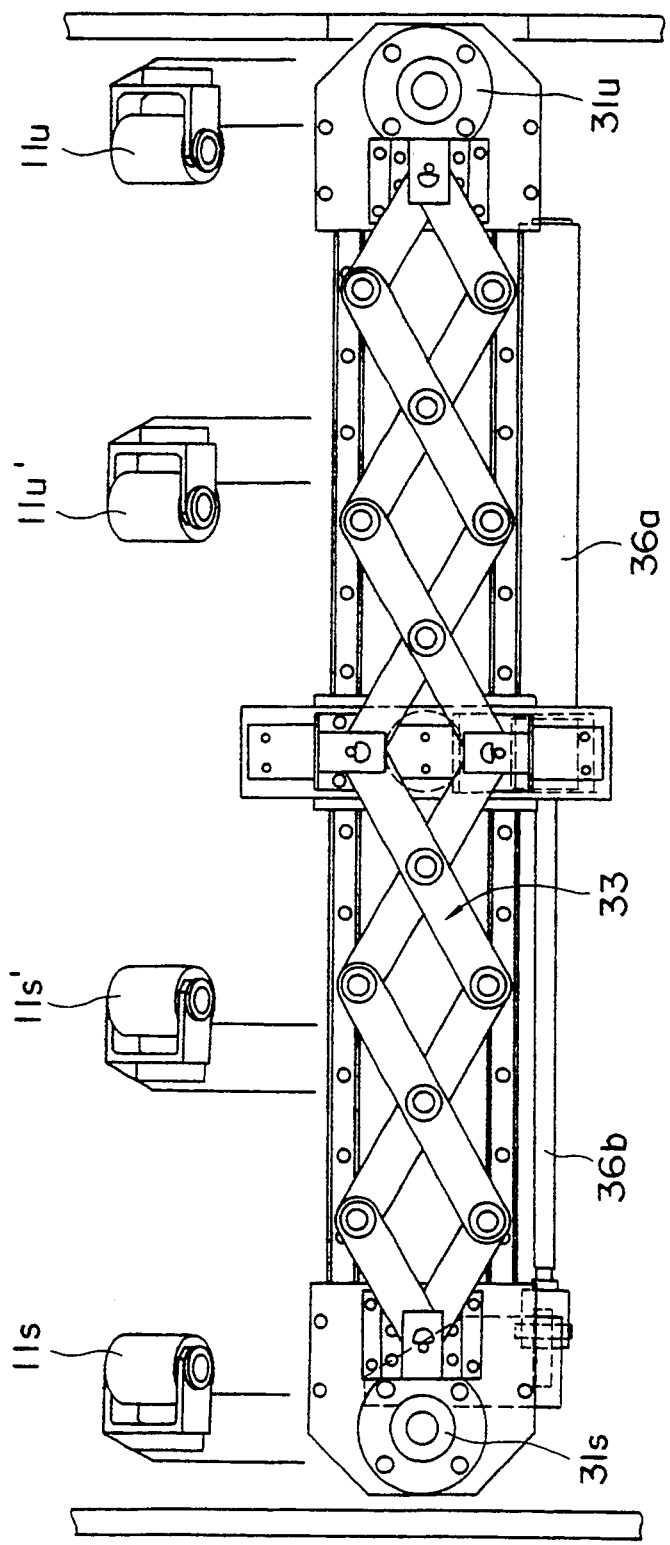
FIG. 13 is a schematic illustration showing in plan view the detailed structure of a roller clamp mechanism provided in the wheel examining apparatus shown in FIG. 10.
Figure 14:
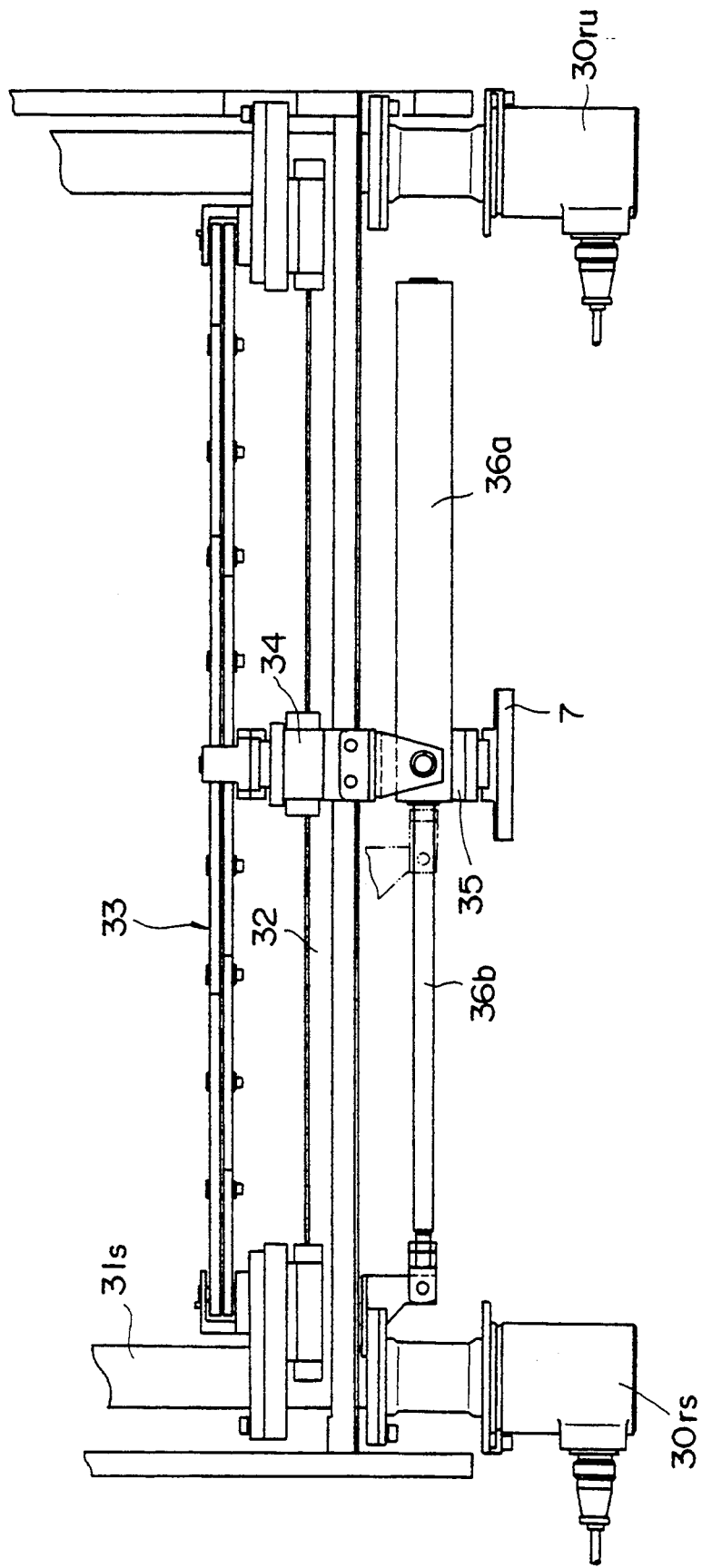
FIG. 14 is a schematic illustration showing in front view the roller clamp mechanism shown in FIG. 13.
Figure 15:
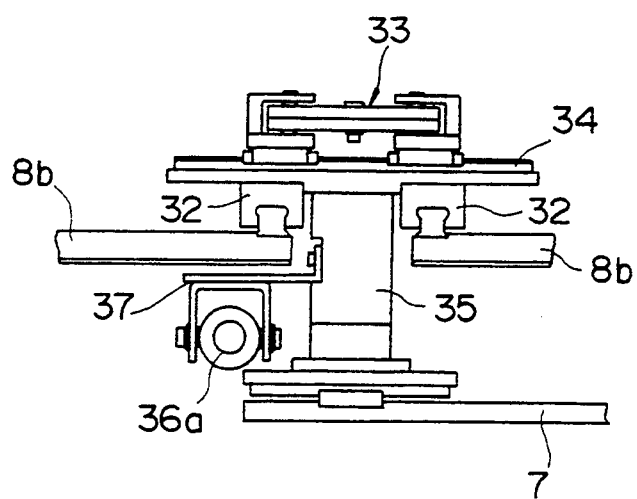
FIG. 15 is a schematic illustration showing in side elevation the roller clamp mechanism shown in FIG. 13.

As best shown in FIG. 15, a cylinder 36a of a clamping cylinder device is fixedly mounted on the center column 35, and a rod 36b, which can move forwardly or backwardly relative to the cylinder 36a, has a front end coupled to the outer roller support 31s as best shown in FIG. 14. Thus, by driving the clamp cylinder 36a, the rod 36b may be caused to move in the forward direction or in the backward direction, whereby the clamping pantagraph 33 is expanded or contracted, and, as a result, the inner and outer contact rollers 11u and 11s are caused to move closer together or separated away from each other. In this case, the center plate 34 is always maintained midway between the inner and outer rollers 11u and 11s, and the left-hand and right-hand center plates 34 are automatically maintained symmetrical in position with respect to the reference center line CL through the pantagraph 5r. Thus, when the inner and outer contact rollers 11u and 11s are caused to move closer together by operating the clamp cylinder 36a, the wheel Wr located therebetween is clamped from both sides, whereby the respective contact rollers are brought into contact with the corresponding side surfaces of the wheel Wr. Under this condition, the center position of the clamp mechanism (i.e., position of the center plate 34) becomes aligned with the center position of the clamped wheel Wr, and, moreover, the left-hand and right-hand wheels Wr are located symmetrical in location with respect to the reference center line CL. That is, the tread center of the left-hand and right-hand wheels Wr becomes located right on the reference center line CL. In FIGS. 12 and 13, the locations where the contact rollers are advanced to their maximum are indicated by assigning a prime to each of the reference numerals, such as 11$u'$ and 11$s'$.

As described above, in the wheel examining apparatus 3 for the rear or intermediate wheels, separate angle detectors 30$ru$ and 30$rs$ are provided for the inner and outer roller supports 31$u$ and 31$s$, respectively. The inner angle detector 30$ru$ is provided to detect the rotating angle around a vertical axis at the roller support section of the inner roller support 31$u$, whereas the outer angle detector 30$rs$ is provided to detect the rotating angle around a vertical axis at the roller support section of the outer roller support 31$s$. Thus, the inner and outer angle detectors 30$ru$ and 30$rs$ can detect the rotating angles independently from each other. The inner contact rollers 11$u$ are provided to be brought into contact with the inner side surface of the wheel Wr, whereas the outer contact rollers 11$s$ are provided to be brought into contact with the outer side surface of the wheel Wr. Thus, according to the present wheel examining apparatus 3, the inclination angles of both of the side surfaces of the wheel Wr can be measured independently from each other.

The wheel examining apparatus 3 having such a double encoder structure is particularly extremely useful in the case where the wheel Wr to be examined has the so-called double wheel or double tire structure. That is, in such a case, instead of a simple single wheel, a pair of sub-wheels or sub-tires are arranged side-by-side on the same rotating axis in a fixed relationship such that the two sub-wheels serve as a combined wheel assembly as if it were a single wheel, and it is not uncommon that these two sub-wheels or sub-tires are mounted together with different inclination angles or alignment conditions. In order to examine such a misalignment condition in setting of the inclination angle, it is necessary to make measurements for each of the sub-wheels or sub-tires individually; however, it was not possible to take such measurements according to the prior art techniques.

In the present wheel examining apparatus 3 having the above-described double encoder structure, since the inclination angles at the opposite inner and outer side surfaces of the wheel Wr can be measured independently from each other, it is possible to measure the inclination angle of each of the sub-wheels or sub-tires independently even with a wheel Wr having the so-called double wheel or double tire structure. Thus, it is possible to determine the amount of deviation of each of the sub-wheels or sub-tires from a predetermined inclination angle.

Now, a floating structure for supporting a wheel movable in any direction in a predetermined plane constructed in accordance with another feature of the present invention will be described in detail below. A preferred embodiment of this floating structure is illustrated in FIGS. 10, 11, and 17 through 20. First, as shown in FIGS. 10 and 11, four linear motion (LM) guide units are mounted on the bottom plate 8$b$ of the housing 8 in a symmetrical arrangement. That is, each LM guide unit includes a pair of lower guide rails 46 fixedly mounted on the bottom plate 8$b$, a lower slider unit 45$b$ slidably mounted on the lower guide rails 46, an upper guide rail 45$a$ fixedly mounted on the lower slider unit 45$b$ extending perpendicularly to the lower guide rails 46, and an upper slider unit 44$b$ slidably mounted on the upper guide rail 45$a$. And, a cylindrically shaped projection 44$a$ projects upwardly from the top surface of each of the upper slider units 44$b$. Thus, each of the projections 44$a$ may move in any direction translationally over a predefined range relative to the bottom plate 8$b$.

On the other hand, a generally T-shaped support roller table or assembly 40 for rotatably supporting a pair of support rollers 15$r$ is located inside the housing 8. The support roller assembly 40 is provided with four circular holes 40$a$, each corresponding to each of the projections 44$a$, and a rotary bearing 43 is mounted in each of the circular holes 40$a$ and fixedly attached to the bottom portion of the support roller assembly 40 by means of an attachment member 43$a$. An inner ring of each of the rotary bearings 43 is fitted onto a corresponding one of the projections 44$a$ to be integrated therewith. Thus, the support roller assembly 40 as a whole is provided to be movable translationally in any direction over a predetermined range and also rotatable around a vertical axis over a predetermined range. An example of the locus of the support roller assembly 40 when it executes a rotary motion relative to the housing 8 is indicated by B in FIG. 17. In this manner, since the support roller assembly 40 can execute a translation motion and a rotational motion at the same time in any direction relative to the housing 8, the support roller assembly 40 is said to be set in a floating state. Thus, in measuring the degree of inclination of the wheel supported on the support rollers 15$r$, since the wheel is maintained in a state in which it can move translationally and rotate in any direction, the degree of inclination of the wheel can be measured at high accuracy.

In this manner, with the above-described structure in which the support roller assembly 40 is maintained in a floating state using four LM guide units, even if a vehicle to be examined is relatively heavy, no particular problems arise and each wheel can be set and maintained in a floating state. Furthermore, with such a four point support structure, force distribution can be achieved so that a well-balanced floating state can be obtained, which also contributes to carry out an examination of a wheel at high accuracy. In the present embodiment, use has been made of four LM guide units; however, the present invention should not be limited only to this particular number of LM guide units and it is also possible to construct a floating structure using three or five or more LM guide units. Alternatively, use may also be made of a plurality of rolling members, such as rollers and balls, or a lubricant material, such as grease, interposed between the bottom plate 8$b$ of the housing 8 and the support roller assembly 40 to provide a floating structure between the support roller assembly 40 and the housing 8.

As described above, since the support roller assembly 40 is maintained in a floating state relative to the housing 8, an initial lock mechanism 10 is provided for locking the support roller assembly 40 at its initial position. That is, a cylinder device 10$a$ is provided with its one end pivotted to a side wall of the housing 8, and the cylinder device 10$a$ houses therein a rod which can be pushed out of and retracted into the cylinder device 10$a$. The rod has a distal end to which the base end of a first lock arm 10$b$ is pivotally connected. On the other hand, the cylinder of the cylinder device 10$a$ has its base end pivotally connected to the housing 8 and also to the base end of a second lock arm 10$c$. Moreover, an interconnection lever 10$d$ pivotally interconnecting the center portions of the first and second lock arms 10$b$ and 10$c$ is provided. A positioning roller 10$e$ is rotatably provided at the distal end of each of the first and second lock arms 10b and 10c. On the other hand, a "V" block member 41 is projectingly provided at the center of each of the front and back ends of the support roller assembly 40 for receiving therein the corresponding positioning roller 10e.

Thus, when the initial position lock device 10 is activated to set in its advanced position, the positioning rollers 10e are cause to move closer together and brought into engagement with the respective V block members 41 and thus the support roller assembly 40 comes to be locked into its initial position substantially at the center of the housing 8. On the other hand, when the initial position lock device 10 is activated to set in its retracted position, the positioning rollers 10e are moved to their retracted positions as shown in FIGS. 10 and 11 and at the same time the support roller assembly 40 is set in its floating state, so that the support roller assembly 40 can move translationally and rotationally freely with a predetermined confines.

In the present wheel examining apparatus, the wheel Wr supported on the support rollers 15r can be subjected to measurements of its inclination angle in a stationary condition, or, alternatively, dynamic measurements can also be taken while keeping the wheel Wr in rotation. In the case of the dynamic mode of operation, the support rollers 15r may be driven to rotate, or, alternatively, the support rollers 15r may be set in a freely rotating condition and the wheel Wr may be driven to rotate by an engine of its vehicle. In this case, due to the inclination angle of the wheel Wr, the support rollers 15r receive an reaction force from the wheel Wr, so that the support roller assembly 40 shifts in the direction of this reaction force. In order to absorb such a reaction force, there is also provided a generally U-shaped first engaging projection 42 at the front end of the support roller assembly 40 and a second engaging projection 48a at a support 48 which is brought into engagement with the first engaging projection 42 during operation. The support 48 is, for example, fixedly mounted on an appropriate exterior member, such as the frame 2. The second engaging projection 48a is provided to be able to advance and retract, and advances to be brought into engagement with the first engaging projection 42 of the support roller assembly 40 when necessary. For this reason, the front end wall of the housing 8 is formed with an opening 8d, through which the second engaging projection 48a gains access to the interior of the housing 8.

Next, referring in particular to FIGS. 16 through 21, a roller lock device 50 for the support rollers 15r will be described in detail below. The support rollers 15r are set in a freely rotating condition during operation, but they are set in a locked condition when a vehicle to be examined is entering into or exiting from the present examination system. For this purpose, a roller lock device 50 is provided for each of the support rollers 15r. Described more in detail, a roller gear 54 is provided as fixedly attached to one end of each of the support rollers 15r and an idle gear 55 is also provided to be always in mesh with the roller gear 54. Also provided is a pair of lock gears 56 and 57 which are disposed on opposite sides of a mesh point between the gears 54 and 55 and normally in mesh with the roller gear 54. These lock gears 56 and 57 are rotatably mounted on a pair of links 52 and 53, respectively, which are pivoted around the rotating axis of the roller gear 54. In addition, a cylinder device comprised of a cylinder 51a and a rod 51b is also provided as bridging between the distal ends of the respective links 52 and 53. Thus, by bringing both of the lock gears 56 and 57 in mesh with both of the roller and idle gears 54 and 55 by activating the cylinder device, the support rollers 15r can be set in its lock state (non-rotating state). On the other hand, when these lock gears 56 and 57 are set in the state shown in FIG. 21, the support rollers 15r are set in its freely rotating state.

As described above, in accordance with the present invention, there is provided an improved wheel examining system and apparatus, in which each wheel can be examined either statically (wheel not in rotation) or dynamically (wheel in rotation) and various parameters of wheel alignment, such as wheel inclination angles, including toe angle and camber angles, can be measured at high accuracy.

In accordance with the first feature of the present invention, there is provided a wheel guide apparatus including a plurality of guide rollers arranged at different levels, and, thus, a vehicle to be examined can be guided into a wheel examining apparatus smoothly and stably and moreover since the vehicle is brought to a desired examining position, its wheels may be located symmetrically with respect to a predetermined reference line automatically. In addition, even in the case where the wheel has the so-called double wheel or double tire structure, the wheel can be guided into a predetermined examining site of a wheel examining apparatus speedily and stably according to the present wheel guide apparatus. Besides, when use is made of the present wheel guide apparatus, the wheel examining apparatus itself can be made smaller in size, and, in particular, in its width.

In accordance with the second feature of the present invention, an intermediate wheel examining section is provided in addition to and inbetween the front and rear wheel examining sections and all of these three sections are independent from one another. Thus, the alignment or inclination angle of each of the wheels of a three-axle vehicle can be measured at high accuracy and at the same time. In particular, since the interconnecting means for interconnecting the left-hand and right-hand wheel examining apparatuses in the intermediate wheel examining section is located downstream thereof with respect to the direction of advancement of a vehicle to be examined and the interconnecting means for interconnecting the left-hand and right-hand wheel examining apparatuses in the rear wheel examining section is located upstream thereof, the wheel examining system for three-axle vehicles can be made smaller in size. In addition, since the intermediate wheel examining section is located in close proximity of the rear wheel examining section, there is no need to provide wheel guide apparatuses for the intermediate wheel examining section.

In accordance with the third feature of the present invention, a double encoder structure including a pair of inner and outer angle detectors associated with the inner and outer clamp rollers, respectively, for clamping the opposite side surfaces of a wheel to be examined is provided. With this structure, each of the opposite side surfaces of a wheel can be examined independently, and, thus, a more refined and high accuracy examination can be carried out. When it is desired to measure the overall inclination angle of a wheel, the measured values from the inner and outer angle detectors can be averaged out. In this manner, since the opposite side surfaces of a wheel can be examined independently, it is possible to find out the presence of any irregularity at one of the two opposite surfaces, so that any kind of irregularity other than those relating to the inclination angle can also be found. In particular, if the wheel to be examined has the so-called double wheel or double tire structure comprised of a pair of sub-wheels or sub-tires, each of the sub-wheels or sub-tires can be examined independently. As a result, the static and dynamic characteristic of a wheel having such a double wheel structure can be determined extremely at high accuracy.

In accordance with the fourth feature of the present invention, there is provided an improved floating device for setting a wheel to be examined in a floating state. With this floating structure, a stable and reliable floating state can be established even for a heavy load vehicle, such as trucks and buses. In addition, in the present floating structure, since use is made only of LM guide units and rotary bearings, the structure is extremely simple and thus it can be manufactured with ease and at low cost.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A wheel examining system for a three axle vehicle having a first axle for front wheels, a second axle for intermediate wheels and a third axle for rear wheels, each axle being on a common body frame, comprising:
   a front wheel examining section;
   an intermediate wheel examining section located upstream of said front wheel examining section with respect to a direction of advancement of said vehicle;
   a rear wheel examining section located upstream of said intermediate wheel examining section with respect to the direction of advancement of said vehicle; and each of said front, intermediate and rear wheel examining sections including:
   left-hand clamp means for clamping a left-hand wheel from both sides;
   right-hand clamp means clamping a right-hand wheel from both sides;
   interconnecting means for interconnecting said left-hand and right-hand clamp means such that said left-hand and right-hand clamp means are always located symmetrically in position with respect to a predetermined center position of said interconnecting means; and
   means for keeping the center position of said interconnecting means of one of said front, intermediate and rear wheel examining sections movable in a transverse direction to a predetermined longitudinal straight line established in said system while keeping the center position of said interconnecting means of each of the remaining wheel examining sections fixed in position in space at least during examining operation.

2. The wheel examining system of claim 1, wherein said intermediate and rear wheel examining sections are located adjacent to each other with said interconnecting means of said intermediate wheel examining section being located downstream of said left-hand and right-hand clamp means with respect to a direction of advancement of said vehicle through said system and said interconnecting means of said rear wheel examining section being located upstream of said left-hand and right-hand clamp means.

3. The wheel examining system of claim 2, wherein said rear wheel examining section includes a wheel guide apparatus for each of the left-hand and right-hand wheels of said vehicle at an entrance thereof.

4. The wheel examining system of claim 2, wherein each of said intermediate and rear wheels of said vehicle has a double wheel structure comprised of a pair of sub-wheels mounted together side-by-side.

5. A wheel examining system for a three axle vehicle having a first axle for a pair of front wheels, a second axle for a pair of intermediate wheels and a third axle for a pair of rear wheels, each axle being on a common body frame, said system comprising:
   a frame;
   a first means mounted on said frame at a first location for determining a first center of the pair of front wheels of said vehicle;
   a second means mounted on said frame at a second location downstream of said first location with respect to a direction of advancement of said vehicle in said system for determining a second center of the pair of intermediate wheels of said vehicle;
   a third means mounted on said frame at a third location downstream of said second location with respect to the direction of advancement of said vehicle in said system for determining a third center of the pair of rear wheels of said vehicle; and
   means for keeping one of said first, second and third means movable with respect to the remaining ones of said first, second and third means in a direction transverse to a predetermined longitudinal straight line established in said system such that said one of said first, second and third means may move relative to said frame as a whole at least during examining operation.

6. The wheel examining system of claim 5, wherein each of said first, second and third means includes a pair of left-hand and right-hand clamping means each for clamping both sides of a wheel and an interconnecting means for interconnecting said pair of left-hand and right-hand clamping means such that said left-hand and right-hand clamping means are located always symmetrical in position with respect to a predetermined center point.

7. The wheel examining system of claim 6, wherein said shifting means includes a linear motion guide assembly interposed between said frame and said one of said first, second and third means and the remaining two of said first, second and third means are fixedly mounted on said frame.

\* \* \* \* \*